(12) United States Patent
Bai et al.

(10) Patent No.: US 12,598,495 B2
(45) Date of Patent: Apr. 7, 2026

(54) TECHNIQUES FOR PANEL-SPECIFIC CLI MEASUREMENT

(71) Applicant: QUALCOMM Incorporated, San Diego, CA (US)

(72) Inventors: Tianyang Bai, Somerville, NJ (US); Yan Zhou, San Diego, CA (US); Qian Zhang, Basking Ridge, NJ (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 723 days.

(21) Appl. No.: 17/715,591

(22) Filed: Apr. 7, 2022

(65) Prior Publication Data

US 2023/0328562 A1     Oct. 12, 2023

(51) Int. Cl.
| | |
|---|---|
| *H04W 24/10* | (2009.01) |
| *H04B 7/0408* | (2017.01) |
| *H04B 17/336* | (2015.01) |
| *H04L 5/00* | (2006.01) |
| *H04W 88/14* | (2009.01) |

(52) U.S. Cl.
CPC .......... *H04W 24/10* (2013.01); *H04B 7/0408* (2013.01); *H04B 17/336* (2015.01); *H04L 5/0051* (2013.01); *H04W 88/14* (2013.01)

(58) Field of Classification Search
CPC .... H04W 24/10; H04W 88/14; H04B 7/0408; H04B 17/336; H04L 5/0051; H04L 5/0057
See application file for complete search history.

(56) References Cited

U.S. PATENT DOCUMENTS

| | | | | |
|---|---|---|---|---|
| 2021/0105683 | A1* | 4/2021 | You | H04B 7/024 |
| 2021/0125450 | A1* | 4/2021 | Ueno | G06Q 20/3278 |
| 2021/0306062 | A1* | 9/2021 | Zhou | H04B 7/0877 |
| 2022/0116129 | A1* | 4/2022 | Ying | H04B 7/0617 |
| 2023/0056592 | A1* | 2/2023 | Wang | H04W 52/325 |
| 2023/0184871 | A1* | 6/2023 | Ernström | G01S 5/0246 342/450 |
| 2023/0344499 | A1* | 10/2023 | Chen | H04B 7/088 |
| 2024/0223343 | A1* | 7/2024 | Fakoorian | H04L 5/0055 |

* cited by examiner

*Primary Examiner* — Sun Jong Kim

(57) ABSTRACT

Methods, systems, and devices for wireless communications are described. A first user equipment (UE) may receive control signaling identifying a set of antenna panels of the first UE usable for measuring crosslink interference (CLI) experienced within a set of CLI resources. The first UE may perform CLI measurements on signals received from a second UE via the set of CLI resources and the set of antenna panels. The first UE may then transmit a CLI report associated with CLI measurements performed on the signals received via an antenna panel of the set of antenna panels. In some implementations, the CLI report includes an indication of the antenna panel, an indication one or more CLI resources from the set of CLI resources associated with the antenna panel, or a combination thereof.

27 Claims, 14 Drawing Sheets

410

420

415

405

400

130

105

115

Network
Entity

Transceiver

1110

Antenna

1115

Communications
Manager

1120

Memory

Code

1130

1125

1140

Processor

1135

1105

1100

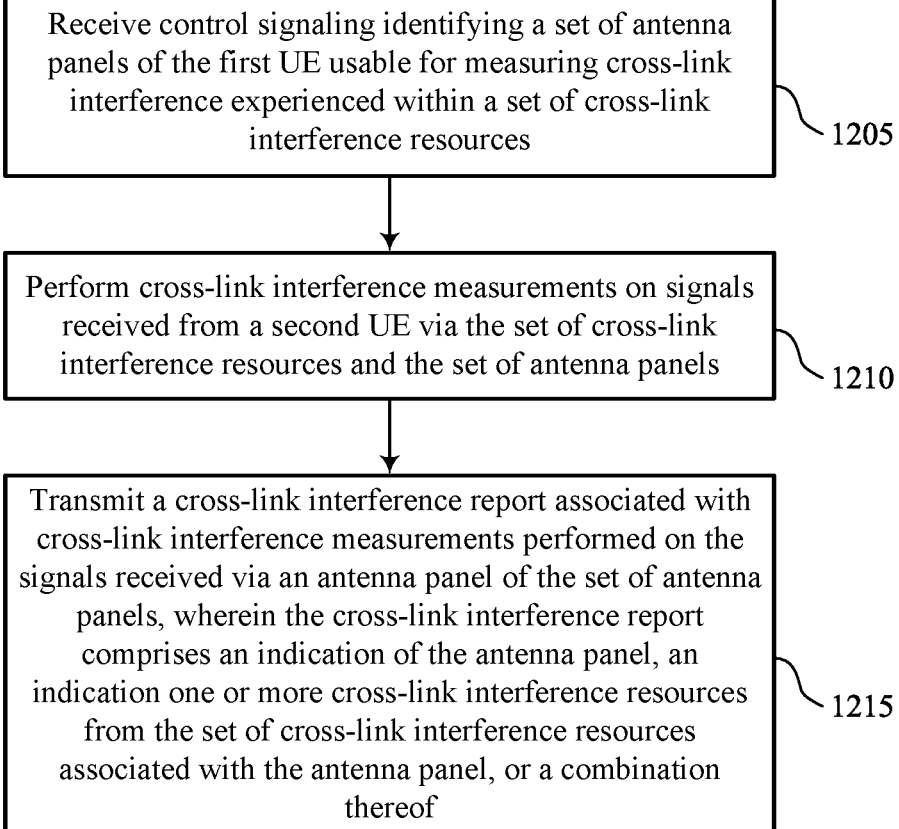

Receive control signaling identifying a set of antenna panels of the first UE usable for measuring cross-link interference experienced within a set of cross-link interference resources

1205

Perform cross-link interference measurements on signals received from a second UE via the set of cross-link interference resources and the set of antenna panels

1210

Transmit a cross-link interference report associated with cross-link interference measurements performed on the signals received via an antenna panel of the set of antenna panels, wherein the cross-link interference report comprises an indication of the antenna panel, an indication one or more cross-link interference resources from the set of cross-link interference resources associated with the antenna panel, or a combination thereof

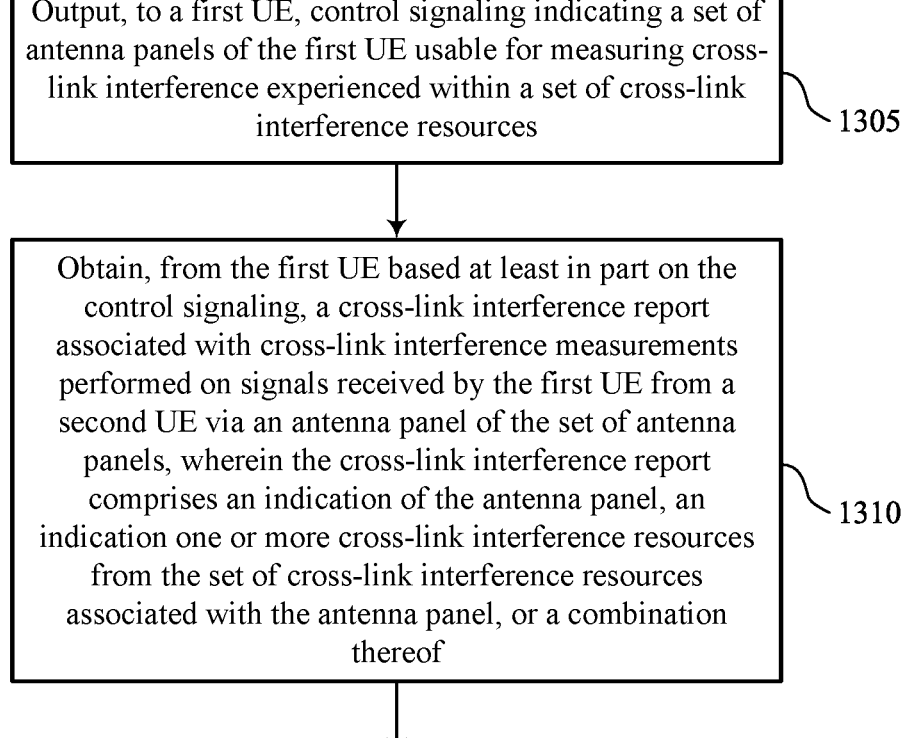

Output, to a first UE, control signaling indicating a set of antenna panels of the first UE usable for measuring cross-link interference experienced within a set of cross-link interference resources

1305

Obtain, from the first UE based at least in part on the control signaling, a cross-link interference report associated with cross-link interference measurements performed on signals received by the first UE from a second UE via an antenna panel of the set of antenna panels, wherein the cross-link interference report comprises an indication of the antenna panel, an indication one or more cross-link interference resources from the set of cross-link interference resources associated with the antenna panel, or a combination thereof

1310

Communicate with the first UE, the second UE, or both, based at least in part on the cross-link interference report

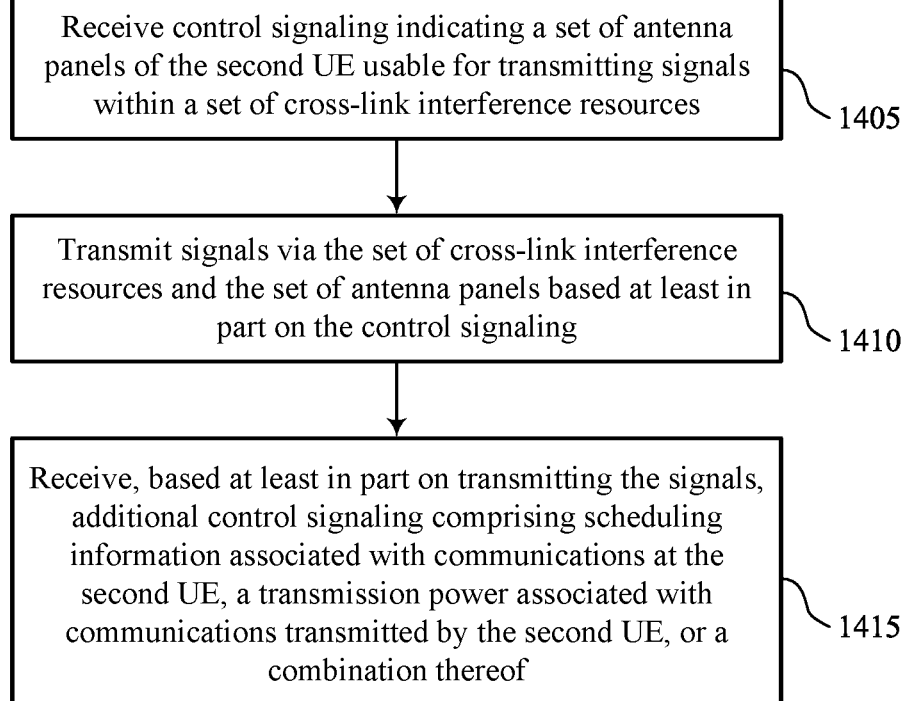

Receive control signaling indicating a set of antenna panels of the second UE usable for transmitting signals within a set of cross-link interference resources

1405

Transmit signals via the set of cross-link interference resources and the set of antenna panels based at least in part on the control signaling

1410

Receive, based at least in part on transmitting the signals, additional control signaling comprising scheduling information associated with communications at the second UE, a transmission power associated with communications transmitted by the second UE, or a combination thereof

TECHNIQUES FOR PANEL-SPECIFIC CLI MEASUREMENT

FIELD OF TECHNOLOGY

The following relates to wireless communications, including techniques for panel-specific cross-link interference (CLI) measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, UEs may be configured to measure cross-link interference (CLI) attributable to signals received from other UEs. For example, a "victim" UE may experience CLI from signals transmitted by an "aggressor" UE in cases where uplink communications transmitted by the aggressor UE collide with downlink communications received by the victim UE. Left unaddressed, CLI may lead to increased noise, and reduce an efficiency and reliability of wireless communications.

SUMMARY

The described techniques relate to improved methods, systems, devices, and apparatuses that support techniques for panel-specific cross-link interference (CLI) measurement. Generally, aspects of the present disclosure support signaling and techniques for antenna panel-specific cross-link interference (CLI) reporting. In some implementations, user equipments (UEs) are enabled to transmit CLI reports which indicate specific antenna panels for which CLI measurements are being reported. For example, a "victim" UE may receive control signaling which indicates CLI resources and corresponding antenna panels that are to be used for performing CLI measurements. The victim UE may then perform CLI measurements using the indicated antenna panels on signals received from another UE (e.g., an "aggressor" UE). The victim UE may then transmit a CLI report with the CLI measurements. The CLI report may indicate which antenna panels correspond to the reported CLI measurements, and/or which CLI resources (which correspond to respective antenna panels) are being reported. As a result, the network can determine specific beams and antenna panels that exhibit sufficient performance (e.g., low CLI), and may schedule the victim UE using the identified beams/antenna panels.

A method for wireless communication at a first UE is described. The method may include receiving control signaling identifying a set of antenna panels of the first UE usable for measuring CLI experienced within a set of CLI resources, performing CLI measurements on signals received from a second UE via the set of CLI resources and the set of antenna panels, and transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

An apparatus for wireless communication at a first UE is described. The apparatus may include a processor, memory coupled with the processor, and instructions stored in the memory. The instructions may be executable by the processor to cause the apparatus to receive control signaling identifying a set of antenna panels of the first UE usable for measuring CLI experienced within a set of CLI resources, perform CLI measurements on signals received from a second UE via the set of CLI resources and the set of antenna panels, and transmit a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

Another apparatus for wireless communication at a first UE is described. The apparatus may include means for receiving control signaling identifying a set of antenna panels of the first UE usable for measuring CLI experienced within a set of CLI resources, means for performing CLI measurements on signals received from a second UE via the set of CLI resources and the set of antenna panels, and means for transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

A non-transitory computer-readable medium storing code for wireless communication at a first UE is described. The code may include instructions executable by a processor to receive control signaling identifying a set of antenna panels of the first UE usable for measuring CLI experienced within a set of CLI resources, perform CLI measurements on signals received from a second UE via the set of CLI resources and the set of antenna panels, and transmit a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

Some examples of the method, apparatuses, and non-transitory computer-readable medium described herein may further include operations, features, means, or instructions for receiving, via the control signaling, an indication of one or more beams to be measured for CLI, the one or more beams associated with the set of antenna panels, the set of CLI resources, or both, where CLI measurements may be associated with the one or more beams.

Some examples of the method, apparatuses, and non-transitory computer-readable medium described herein may further include operations, features, means, or instructions for receiving, via the control signaling, one or more CLI indexes associated with the set of CLI resources, where each CLI index may be associated with a receive beam at the first UE and a transmit beam at the second UE, where performing the CLI measurements may be based on the one or more CLI indexes.

In some examples of the method, apparatuses, and non-transitory computer-readable medium described herein, each CLI index may be associated with at least one antenna panel of the set of antenna panels.

Some examples of the method, apparatuses, and non-transitory computer-readable medium described herein may further include operations, features, means, or instructions for receiving, via the control signaling, one or more antenna group identifiers associated with the set of antenna panels, one or more sounding reference signal (SRS) resource set identifiers associated with the set of antenna panels, or both, where performing the CLI measurements may be based on the one or more antenna group identifiers, the one or more SRS resource set identifiers, or both.

Some examples of the method, apparatuses, and non-transitory computer-readable medium described herein may further include operations, features, means, or instructions for receiving, via the control signaling, a set of mappings between the set of antenna panels and the set of CLI resources, the set of mappings including a mapping between the antenna panel and a CLI resource from the set of CLI resources corresponding to the antenna panel and transmitting, via the CLI report and based on the mapping, an indication of the CLI resource corresponding to the antenna panel.

Some examples of the method, apparatuses, and non-transitory computer-readable medium described herein may further include operations, features, means, or instructions for transmitting, via the CLI report, a set of multiple CLI measurements and a set of multiple antenna panel identifiers corresponding to the respective set of multiple CLI measurements, where the set of multiple antenna panel identifiers may be associated with the set of antenna panels.

Some examples of the method, apparatuses, and non-transitory computer-readable medium described herein may further include operations, features, means, or instructions for transmitting, via the CLI report, a set of multiple CLI measurements and an antenna panel identifier associated with the antenna panel, where the antenna panel identifier corresponds to the set of multiple CLI measurements.

Some examples of the method, apparatuses, and non-transitory computer-readable medium described herein may further include operations, features, means, or instructions for receiving, via the control signaling, an indication of a quasi co-location (QCL) indicator and a set of antenna panel identifiers associated with the QCL indicator, the set of antenna panel identifiers corresponding to the set of antenna panels, and the QCL indicator associated with the set of CLI resources, where performing the CLI measurements may be based on the QCL indicator and the set of antenna panel identifiers.

Some examples of the method, apparatuses, and non-transitory computer-readable medium described herein may further include operations, features, means, or instructions for receiving, via the control signaling, an indication of one or more SRS resource sets associated with the set of antenna panels, the one or more SRS resource sets associated with the set of CLI resources, where performing the CLI measurements may be based on the one or more SRS resource sets.

In some examples of the method, apparatuses, and non-transitory computer-readable medium described herein, the CLI report may be transmitted via Layer one (L1) signaling.

In some examples of the method, apparatuses, and non-transitory computer-readable medium described herein, the signals received from the second UE include SRSs.

A method for wireless communication at a network entity is described. The method may include transmitting, to a first UE, control signaling indicating a set of antenna panels of the first UE usable for measuring CLI experienced within a set of CLI resources, receiving, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof, and communicating with the first UE, the second UE, or both, based on the CLI report.

An apparatus for wireless communication at a network entity is described. The apparatus may include a processor, memory coupled with the processor, and instructions stored in the memory. The instructions may be executable by the processor to cause the apparatus to transmit, to a first UE, control signaling indicating a set of antenna panels of the first UE usable for measuring CLI experienced within a set of CLI resources, receive, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof, and communicate with the first UE, the second UE, or both, based on the CLI report.

Another apparatus for wireless communication at a network entity is described. The apparatus may include means for transmitting, to a first UE, control signaling indicating a set of antenna panels of the first UE usable for measuring CLI experienced within a set of CLI resources, means for receiving, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof, and means for communicating with the first UE, the second UE, or both, based on the CLI report.

A non-transitory computer-readable medium storing code for wireless communication at a network entity is described. The code may include instructions executable by a processor to transmit, to a first UE, control signaling indicating a set of antenna panels of the first UE usable for measuring CLI experienced within a set of CLI resources, receive, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof, and communicate with the first UE, the second UE, or both, based on the CLI report.

Some examples of the method, apparatuses, and non-transitory computer-readable medium described herein may further include operations, features, means, or instructions for transmitting, to the second UE, additional control signaling indicating a second set of antenna panels of the second UE usable for transmitting the signals to the first UE within the set of CLI resources, where receiving the CLI report may be based on transmitting the additional control signaling.

Some examples of the method, apparatuses, and non-transitory computer-readable medium described herein may further include operations, features, means, or instructions for transmitting, via the control signaling, an indication of one or more beams to be measured for CLI, the one or more beams associated with the set of antenna panels, the set of CLI resources, or both, where the CLI report may be associated with the one or more beams.

Some examples of the method, apparatuses, and non-transitory computer-readable medium described herein may further include operations, features, means, or instructions for transmitting, via the control signaling, one or more CLI indexes associated with the set of CLI resources, where each CLI index may be associated with a receive beam at the first UE and a transmit beam at the second UE, where the CLI report may be based on the one or more CLI indexes.

In some examples of the method, apparatuses, and non-transitory computer-readable medium described herein, each CLI index may be associated with at least one antenna panel of the set of antenna panels.

Some examples of the method, apparatuses, and non-transitory computer-readable medium described herein may further include operations, features, means, or instructions for transmitting, via the control signaling, one or more antenna group identifiers associated with the set of antenna panels, one or more SRS resource set identifiers associated with the set of antenna panels, or both, where the CLI report may be based on the one or more antenna group identifiers, the one or more SRS resource set identifiers, or both.

Some examples of the method, apparatuses, and non-transitory computer-readable medium described herein may further include operations, features, means, or instructions for transmitting, via the control signaling, a set of mappings between the set of antenna panels and the set of CLI resources, the set of mappings including a mapping between the antenna panel and a CLI resource from the set of CLI resources corresponding to the antenna panel and receiving, via the CLI report and based on the mapping, an indication of the CLI resource corresponding to the antenna panel.

Some examples of the method, apparatuses, and non-transitory computer-readable medium described herein may further include operations, features, means, or instructions for receiving, via the CLI report, a set of multiple CLI measurements and a set of multiple antenna panel identifiers corresponding to the respective set of multiple CLI measurements, where the set of multiple antenna panel identifiers may be associated with the set of antenna panels.

Some examples of the method, apparatuses, and non-transitory computer-readable medium described herein may further include operations, features, means, or instructions for receiving, via the CLI report, a set of multiple CLI measurements and an antenna panel identifier associated with the antenna panel, where the antenna panel identifier corresponds to the set of multiple CLI measurements.

Some examples of the method, apparatuses, and non-transitory computer-readable medium described herein may further include operations, features, means, or instructions for transmitting, via the control signaling, an indication of a QCL indicator and a set of antenna panel identifiers associated with the QCL indicator, the set of antenna panel identifiers corresponding to the set of antenna panels, and the QCL indicator associated with the set of CLI resources, where the CLI report may be based on the QCL indicator and the set of antenna panel identifiers.

Some examples of the method, apparatuses, and non-transitory computer-readable medium described herein may further include operations, features, means, or instructions for transmitting, via the control signaling, an indication of one or more SRS resource sets associated with the set of antenna panels, the one or more SRS resource sets associated with the set of CLI resources, where the CLI report may be based on the one or more SRS resource sets.

In some examples of the method, apparatuses, and non-transitory computer-readable medium described herein, the CLI report may be received via L1 signaling.

A method for wireless communication at a second UE is described. The method may include receiving control signaling indicating a set of antenna panels of the second UE usable for transmitting signals within a set of CLI resources, transmitting signals via the set of CLI resources and the set of antenna panels based on the control signaling, and receiving, based on transmitting the signals, additional control signaling including scheduling information associated with communications at the second UE, a transmission power associated with communications transmitted by the second UE, or a combination thereof.

An apparatus for wireless communication at a second UE is described. The apparatus may include a processor, memory coupled with the processor, and instructions stored in the memory. The instructions may be executable by the processor to cause the apparatus to receive control signaling indicating a set of antenna panels of the second UE usable for transmitting signals within a set of CLI resources, transmit signals via the set of CLI resources and the set of antenna panels based on the control signaling, and receive, based on transmitting the signals, additional control signaling including scheduling information associated with communications at the second UE, a transmission power associated with communications transmitted by the second UE, or a combination thereof.

Another apparatus for wireless communication at a second UE is described. The apparatus may include means for receiving control signaling indicating a set of antenna panels of the second UE usable for transmitting signals within a set of CLI resources, means for transmitting signals via the set of CLI resources and the set of antenna panels based on the control signaling, and means for receiving, based on transmitting the signals, additional control signaling including scheduling information associated with communications at the second UE, a transmission power associated with communications transmitted by the second UE, or a combination thereof.

A non-transitory computer-readable medium storing code for wireless communication at a second UE is described. The code may include instructions executable by a processor to receive control signaling indicating a set of antenna panels of the second UE usable for transmitting signals within a set of CLI resources, transmit signals via the set of CLI resources and the set of antenna panels based on the control signaling, and receive, based on transmitting the signals, additional control signaling including scheduling information associated with communications at the second UE, a transmission power associated with communications transmitted by the second UE, or a combination thereof.

Some examples of the method, apparatuses, and non-transitory computer-readable medium described herein may further include operations, features, means, or instructions for receiving, via the control signaling, an indication of one or more beams usable for transmitting the signals, the one or more beams associated with the set of antenna panels, the set of CLI resources, or both, where transmitting the signals may be based on the one or more beams.

Some examples of the method, apparatuses, and non-transitory computer-readable medium described herein may further include operations, features, means, or instructions for receiving, via the control signaling, one or more CLI indexes associated with the set of CLI resources, where each CLI index may be associated with a transmit beam at the second UE and a receive beam at a first UE, where the signals may be transmitted to the first UE based on the one or more CLI indexes.

In some examples of the method, apparatuses, and non-transitory computer-readable medium described herein, each CLI index may be associated with at least one antenna panel of the set of antenna panels.

Some examples of the method, apparatuses, and non-transitory computer-readable medium described herein may further include operations, features, means, or instructions for receiving, via the control signaling, one or more antenna group identifiers associated with the set of antenna panels, one or more SRS resource set identifiers associated with the set of antenna panels, or both, where transmitting the signals may be based on the one or more antenna group identifiers, the one or more SRS resource set identifiers, or both.

Some examples of the method, apparatuses, and non-transitory computer-readable medium described herein may further include operations, features, means, or instructions for receiving, via the control signaling, an indication of one or more transmit beams and a set of antenna panel identifiers associated with the one or more transmit beams, the set of antenna panel identifiers corresponding to the set of antenna panels, and the one or more transmit beams associated with the set of CLI resources, where transmitting the signals may be based on the one or more transmit beams and the set of antenna panel identifiers.

Some examples of the method, apparatuses, and non-transitory computer-readable medium described herein may further include operations, features, means, or instructions for receiving, via the control signaling, an indication of one or more SRS resource sets associated with the set of antenna panels, the one or more SRS resource sets associated with the set of CLI resources, where transmitting the signals may be based on the one or more SRS resource sets.

In some examples of the method, apparatuses, and non-transitory computer-readable medium described herein, the signals transmitted via the set of CLI resources include SRSs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 12 through 14 show flowcharts illustrating methods that support techniques for panel-specific CLI measurement in accordance with one or more aspects of the present disclosure.

DETAILED DESCRIPTION

In some wireless communications systems, user equipments (UE) may perform cross-link interference (CLI) measurements on interfering signals received from other UEs. For example, a "victim" UE may experience CLI from signals transmitted by an "aggressor" UE in cases where uplink communications transmitted by the aggressor UE collide with downlink communications received by the victim UE. The network may utilize CLI reports from victim UEs to mitigate CLI throughout the network, such as by adjusting scheduling across UEs, reducing transmit powers of aggressor UEs, and the like.

As wireless communications increase in frequency, UEs are fabricated with increasing quantities of antenna elements, which are grouped into antenna panels. Conventional CLI reporting techniques only allow UEs to report CLI for respective beams, and do not allow UEs to report CLI on a panel-by-panel basis. Further, different antenna panels may be used to perform communications using the same beam, and may experience different CLI. In this regard, if a UE reports high CLI for a beam using a first antenna panel, the network may not know whether the same beam exhibits low CLI using a different antenna panel, and may therefore avoid scheduling communications using the beam altogether. As such, conventional CLI reporting techniques are incomplete and inadequate, as such conventional CLI reporting techniques do not provide the network with a complete picture regarding CLI experienced at different antenna panels of victim UEs.

Accordingly, aspects of the present disclosure are directed to signaling and techniques for antenna panel-specific CLI reporting. In accordance with some aspects of the present disclosure, UEs may be enabled to transmit CLI reports which indicate specific antenna panels for which CLI measurements are being reported. For example, a victim UE may receive control signaling which indicates CLI resources and corresponding antenna panels that are to be used for performing CLI measurements. The victim UE may then perform CLI measurements using the indicated antenna panels on signals received from another aggressor UE. The victim UE may then transmits a CLI report with the CLI measurements. The CLI report may indicate which antenna panels correspond to the reported CLI measurements, and/or which CLI resources (which correspond to respective antenna panels) are being reported. As a result, the network can determine specific beams and antenna panels that exhibit sufficient performance (e.g., low CLI), and may schedule the victim UE using the identified beams/antenna panels.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for panel-specific CLI measurement.

Figure 1:
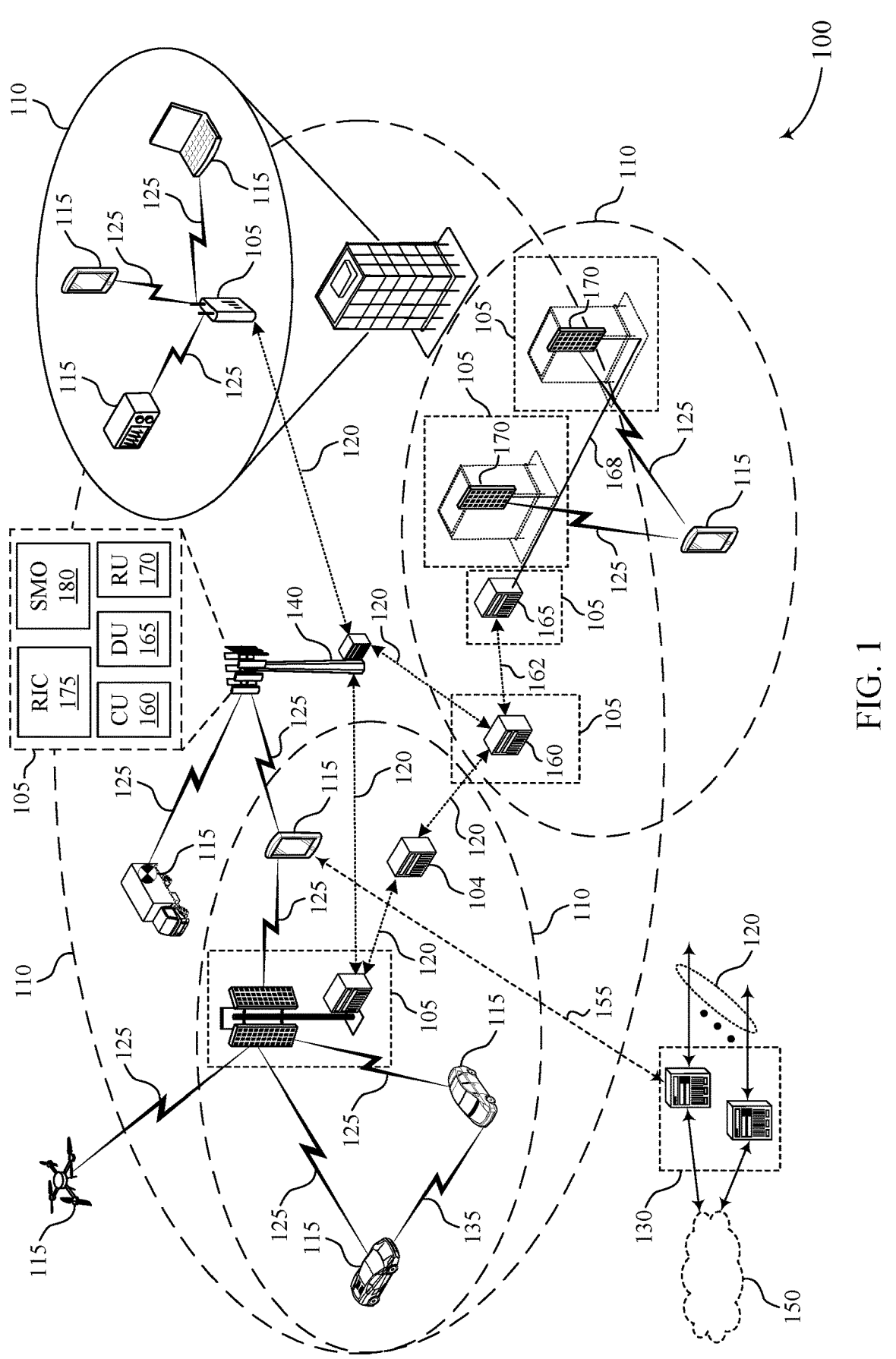
FIG. 1 illustrates an example of a wireless communications system that supports techniques for panel-specific cross-link interference (CLI) measurement in accordance with one or more aspects of the present disclosure.

FIG. 1 illustrates an example of a wireless communications system 100 that supports techniques for panel-specific CLI measurement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child TAB node 104 to receive signaling from a parent TAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from TAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for panel-specific CLI measurement as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may output (e.g., transmit) a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may output (e.g., transmit) a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, the UEs 115 and the network entities 105 (e.g., base stations) of the wireless communications system 100 may support signaling and techniques for antenna panel-specific CLI reporting. In particular, aspects of the present disclosure may enable victim UEs 115 to transmit CLI reports which indicate specific antenna panels for which CLI measurements are being reported. In this regard, aspects of the present disclosure may enable UEs 115 to report CLI experienced at the respective UEs 115 on a panel-by-panel basis, thereby providing the network with a more complete and comprehensive picture regarding CLI experienced at the respective UEs 115, which may further improve an ability of the network to schedule wireless communications at the UEs 115.

For example, a victim UE 115 of the wireless communications system 200 may obtain (e.g., receive) control signaling from a network entity 105, where the control signaling indicates CLI resources and corresponding antenna panels at the victim UE 115 which are to be used for performing CLI measurements. The victim UE 115 may then perform CLI measurements using the indicated antenna panels on signals received from another aggressor UE 115. The victim UE 115 may then transmits a CLI report with the CLI measurements to the network entity 105. In some aspects, the CLI report may indicate which antenna panels correspond to the reported CLI measurements, and/or which CLI resources (which may correspond to respective antenna panels) are being reported. As a result, the network (e.g., network entity 105) can determine specific beams and antenna panels that exhibit sufficient performance (e.g., low CLI) at the victim UE 115, and may schedule the victim UE 115 using the identified beams/antenna panels.

Techniques described herein may support antenna panel-specific CLI reporting which enables UEs 115 to report CLI experienced at the respective UEs 115 on a panel-by-panel basis. Accordingly, techniques described herein may improve a granularity at which CLI may be reported to the network, thereby providing the network with a more complete and comprehensive picture regarding CLI experienced at the respective UEs 115. Moreover, by enabling UEs 115 to report CLI experienced at specific antenna panels, techniques described herein may enable the network to schedule wireless communications at UEs 115 via antenna panels that exhibit sufficient performance (e.g., low CLI), which may thereby improve an efficiency and reliability of wireless communications performed within the wireless communications system 100.

Figure 2:
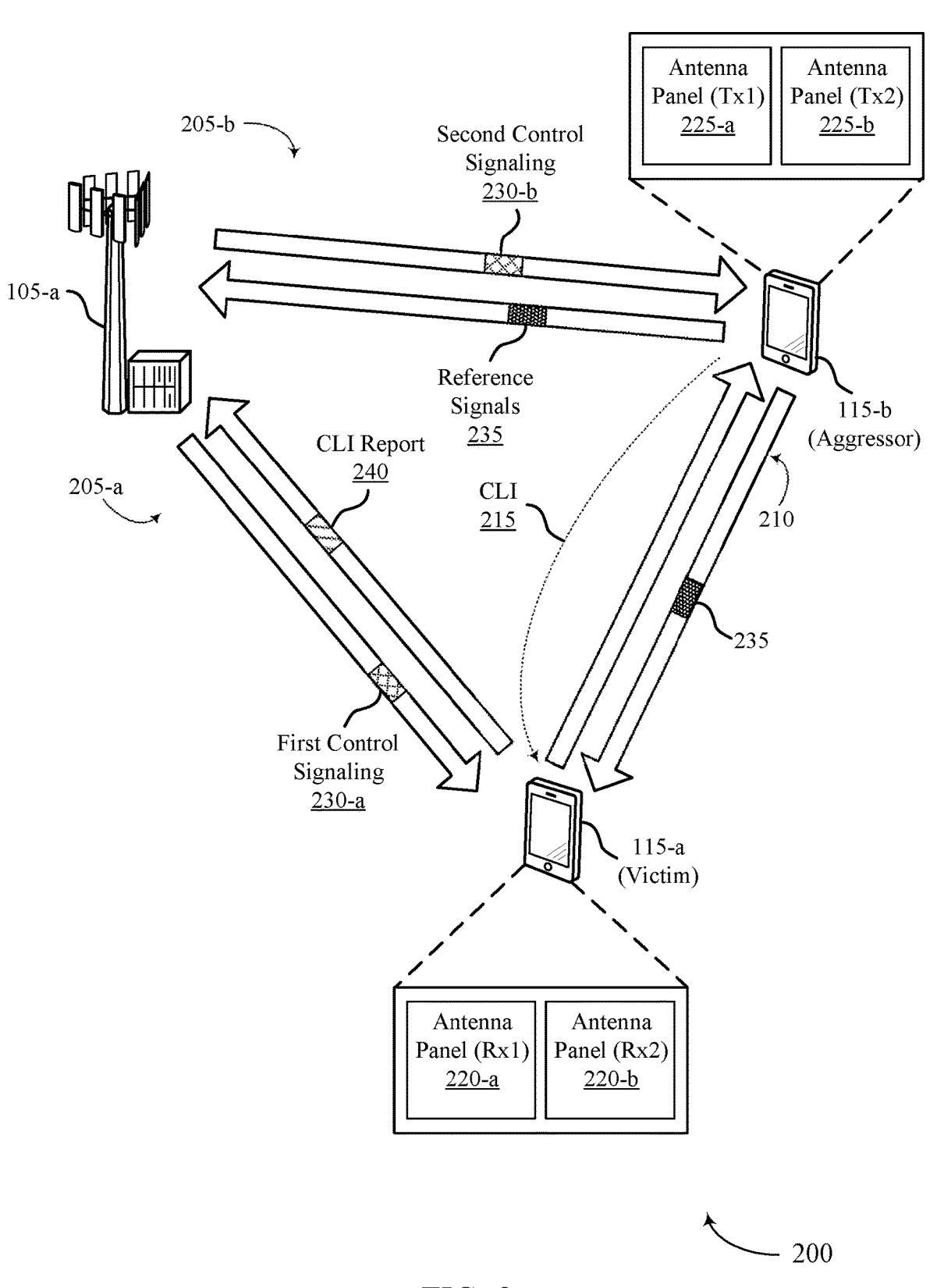
FIG. 2 illustrates an example of a wireless communications system that supports techniques for panel-specific CLI measurement in accordance with one or more aspects of the present disclosure.

FIG. 2 illustrates an example of a wireless communications system 200 that supports techniques for panel-specific CLI measurement in accordance with one or more aspects of the present disclosure. In some examples, aspects of the wireless communications system 200 may implement, or be implemented by, aspects of the wireless communications system 100. In particular, the wireless communications system 200 may support signaling and techniques for antenna panel-specific CLI reporting, as described herein.

The wireless communications system 200 may include a network entity 105-a, a first UE 115-a (e.g., victim UE 115-a), and a second UE 115-b (e.g., aggressor UE 115-b), which may be examples of network entities 105 and UEs 115 as described with reference to FIG. 1. The first UE 115-a and the second UE 115-b may communicate with the network entity 105-a using communication links 205-a and 205-b, respectively, which may be examples of NR or LTE links between the UEs 115-a, 115-b and the network entity 105-a. In some cases, the communication links 205-a, 205-b between the UEs 115-a, 115-b and the network entity 105-a may include examples of access links (e.g., Uu links) which may include bi-directional links that enable both uplink and downlink communication. For example, the first UE 115-a may output (e.g., transmit) uplink signals, such as uplink control signals or uplink data signals, to one or more components of the network entity 105-a using the communication link 205-a, and one or more components of the network entity 105-a may output (e.g., transmit) downlink signals, such as downlink control signals or downlink data signals, to the first UE 115-a using the communication link 205-a. Similarly, the first UE 115-a and the second UE 115-b may communicate with one another via a communication link 110, which may be an example of a sidelink communication link or a PC5 link.

In some aspects, each of the UEs 115-a, 115-b may be configured to perform wireless communications via one or more antenna panels. For example, the first UE 115-a may include a first antenna panel 220-a and a second antenna panel 220-b. Similarly, the second UE 115-b may include a first antenna panel 225-a and a second antenna panel 225-b. As it is used herein, the term "antenna panel," "UE panel," and like terms, may be a "virtual concept" referring to a number or group of antenna elements that the respective UE 115 uses to form Tx/Rx beams usable for performing wireless communications. Moreover, while much of the present disclosure is described in the context of the antenna panels 220 at the first UE 115-a including Rx antenna panels, and the antenna panels 225 of the second UE 115-b including Tx antenna panels, this is solely for illustrative purposes to describe the relative direction of communications in the context of CLI experienced at the first UE 115-*a*. In this regard, each of the antenna panels 220, 225 may be configured to transmit wireless communications, receive wireless communications, or both.

As noted previously herein, UEs 115 may be configured to measure CLI attributable to signals received from other UEs 115. For example, as shown in FIG. 2 and in the context of a dynamic TDD communications mode, the first UE 115-*a* (e.g., "victim" UE 115-*a*) may experience CLI 215 attributable to signals transmitted by the second UE 115-*b* (e.g., "aggressor" UE 115-*b*) in cases where uplink communications transmitted by the second UE 115-*b* collide with downlink communications received by the first UE 115-*a*. In other words, the first UE 115-*a* may experience CLI 215 when the network entity 105-*a* transmits downlink signals which overlap with (e.g., at the same time as) uplink signals transmitted by the second UE 115-*b*. The first UE 115-*a* may experience CLI 215 even in cases where the uplink communications transmitted by the second UE 115-*b* are not intended for the first UE 115-*a*, but are nonetheless received or intercepted by the first UE 115-*a*.

In some implementations, the first UE 115-*a* may be configured to measure the CLI 215 experienced at the first UE 115-*a*, and transmit a CLI report 240 to the network entity 105-*a*. The network entity 105-*a* may utilize CLI reports from the first UE 115-*a* to mitigate CLI 215 experienced by the first UE 115-*a*, such as by adjusting scheduling across the UEs 115-*a*, 115-*b*, reducing transmit powers of the second UE 115-*b*, and the like. In other words, the network entity 105-*a* may make scheduling decisions based on CLI reports received from the first UE 115-*a*. For example, in cases where the first UE 115-*a* experiences strong CLI 215 attributable to signals transmitted by the second UE 115-*b*, the network entity 105-*a* may consider scheduling the first UE 115-*a* and the second UE 115-*b* in different time/frequency resources to avoid the strong CLI 215.

Moreover, some wireless communications systems enable network entities and other devices to perform both half-duplex and full-duplex communications. In the context of a half-duplex operational mode, a wireless device (e.g., network entity 105-*a*, UEs 115) may be configured to transmit or receive in only one direction at a time. Comparatively, in the context of a full-duplex operational mode, a wireless devices may be able to simultaneously perform downlink and uplink communications. For example, the network entity 105-*a* of the wireless communications system 200 may support a full-duplex operational mode in which the network entity 105-*a* is able to simultaneously transmit downlink communications and receive uplink communications. Such full-duplex capabilities at network entities 105 may increase the prevalence of CLI 215 experienced by UEs 115 within the wireless communications systems 200 due to the simultaneous performance of downlink and uplink communications.

When performing CLI measurements, the second UE 115-*b* may output (e.g., transmit) reference signals 235 (e.g., sounding reference signals (SRSs)) which at least partially overlap in the time domain with downlink communications scheduled at the first UE 115-*a*. As such, some reference signals 235 may be received, or otherwise intercepted, by the first UE 115-*a*, and the first UE 115-*a* may measure a resulting interference strength (e.g., strength of CLI 215) of the received reference signals 235 on the scheduled downlink communications. The first UE 115-*a* may report CLI measurements to the network entity 105-*a* via a CLI report 240, where the CLI measurements may be indicated via reference signal received power (RSRP) measurements (e.g., SRS-RSRP), received signal strength indicator (RSSI) measurements (e.g., CLI-RSSI), or both. In some aspects, the first UE 115-*a* may report CLI measurements (e.g., transmit CLI reports) periodically, or based on certain triggering conditions (e.g., when measured CLI 215 is above some threshold).

Some CLI reporting techniques enable CLI reports 240 to be transmitted via Layer 3 (L3) signaling (e.g., not Layer 1 (L1) measurements). In such cases, CLI reports 240 received by the network entity 105-*a* may be collected by a gNB-CU, then reported to the gNB-DU. Such L1 signaling may increase a latency of CLI reporting, which may increase a time for CLI mitigation at the first UE 115-*a*. Moreover, increased L1 latency may cause filtered results which are not suitable for fast beam selection (e.g., fast L1 beam selection) in response to interference variation (e.g., CLI variation). Further, configuration updates via L3 signaling may require RRC reconfiguration, which inefficient, not overly flexible, and which further increases a latency of CLI reporting. Accordingly, as will be described in further detail herein, some aspects of the present disclosure enable CLI reports 240 to be transmitted via L1 signaling (e.g., via MAC-CE, uplink control information (UCI)). As compared to L3 signaling, in which CLI reports 240 are collected by the gNB-CU and reported to the gNB-DU, CLI reports transmitted via L1 signaling may be collected directly by the gNB-DU, thereby reducing a latency of CLI reporting relative to conventional CLI reporting techniques which rely on L3 signaling. As such, techniques described herein may provide for more dynamic CLI reporting with reduced latency, which may enable fast beam selection in response to reported CLI 215.

In some wireless communications systems, transmit (Tx) and receive (Rx) beams at UEs 115 are primarily indicated by downlink reference signals, where the antenna panels (e.g., antenna panels 220, 225) selected for the respective Tx/Rx beams may be left up to UE 115 implementation. Comparatively, some other wireless communications systems may enable panel-specific Tx/Rx beam scheduling. In some cases, an antenna panel 220, 225 (e.g., UE panel) may be identified by a panel ID, which may be a reference signal resource set (e.g., SRS resource set), antenna group ID, and the like. For example, the first UE 115-*a* may include a first antenna panel 220-*a* and a second antenna panel 220-*b*, where the respective antenna panels 220 are identified via panel IDs, SRS resource sets, antenna group IDs, and the like. Similarly, the second UE 115-*b* may include a first antenna panel 225-*a* and a second antenna panel 225-*b*, where the respective antenna panels 220 are identified via panel IDs, SRS resource sets, antenna group IDs, and the like. In some cases, UEs 115 (e.g., first UE 115-*a*, second UE 115-*b*) may report to the network entity 105-*a* an activation and/or deactivation of antenna panels 220, 225, along with capabilities of respective antenna panels 220, 225 (e.g., maximum number of layers supported by each respective antenna panel 220, 225). The network entity 105-*a* may configure the UEs 115-*a*, 115-*b* to transmit and receive wireless communications (e.g., channels, reference signals) via a particular antenna panel 220, 225.

However, as noted previously herein, some conventional CLI reporting techniques only allow UEs 115 to report CLI 215 for respective beams, and do not allow UEs 115 to report CLI 215 on a panel-by-panel basis (e.g., report CLI per antenna panel 220-*a*, 220-*b*). That is, using some conventional CLI reporting techniques, the first UE 115-*a* may be able to report CLI 215 experienced at particular Rx beams at the first UE 115-*a*, but may be unable to indicate CLI 215 experienced at particular antenna panels 220 of the first UE 115-*a*. Further, different antenna panels 220, 225 may be used to perform communications using the same beam, and may experience different CLI 215. For example, the first antenna panel 220-*a* and the second antenna panel 220-*b* of the first UE 115-*a* may both be used to generate an Rx beam used to receive wireless communications, where the first and second antenna panels 220 may experience different levels of CLI 215. In this regard, if the first UE 115-*a* reports high CLI for the Rx beam using the first antenna panel 220-*a*, the network may not know whether the same Rx beam exhibits low CLI using the second antenna panel 220-*b*, and may therefore avoid scheduling communications using the Rx beam altogether (even if the same Rx beam exhibits low CLI using the second antenna panel 220-*b*). As such, conventional CLI reporting techniques are incomplete and inadequate, as such conventional CLI reporting techniques do not provide the network with a complete picture regarding CLI 215 experienced at different antenna panels 220 of victim UEs 115.

Accordingly, the network entity 105-*a* and the UEs 115-*a*, 115-*b* of the wireless communications system 200 may support signaling and techniques for antenna panel-specific CLI reporting. In particular, aspects of the present disclosure may enable the first UE 115-*a* (e.g., victim UE 115-*a*) to transmit CLI reports 240 which indicate specific antenna panels 220 for which CLI measurements are being reported. In this regard, aspects of the present disclosure may enable the first UE 115-*a* to report CLI 215 experienced at the first UE 115 on a panel-by-panel basis, thereby providing the network entity 105-*a* with a more complete and comprehensive picture regarding CLI 215 experienced at the first UE 115-*a*, which may further improve an ability of the network entity 105-*a* to schedule wireless communications at the first UE 115-*a* (e.g., schedule communications at the first UE 115-*a* using antenna panels 220 that exhibit low CLI 215).

For example, as shown in FIG. 2, the network entity 105-*a* may output (e.g., transmit) first control signaling 230-*a*-*a* to the first UE 115-*a*, where the first control signaling 230-*a*-*a* includes or indicates a CLI reporting configuration including parameters, resources, and/or characteristics for CLI reporting. In particular, the first control signaling 230-*a*-*a* may indicate a set of antenna panels 220 (e.g., set of Rx antenna panels 220) of the first UE 115-*a* usable for measuring CLI 215 experienced within a set of CLI resources. Similarly, in some aspects, the network entity 105-*a* may output (e.g., transmit) second control signaling 230-*b* to the second UE 115-*b*, where the second control signaling 230-*b* includes or indicates a CLI reporting configuration including parameters, resources, and/or characteristics for CLI reporting. In particular, the second control signaling 230-*b* may indicate a set of antenna panels 225 (e.g., set of Tx antenna panels 225) of the second UE 115-*b* usable for transmitting signals (e.g., reference signals 235) within a set of CLI resources that will be used for CLI measurement at the first UE 115-*a*. In other words, the network entity 105-*a* may specify which Tx antenna panel(s) 225 and/or Rx antenna panel(s) 220 are to be used for CLI measurements.

CLI resources may include sets of measurement occasions or measurement resources that are to be measured for CLI 215. As will be described in further detail herein, CLI resources may be associated with or identified by one or more identifiers, such as SRS resource set IDs. In some cases, the first control signaling 230-*a*-*a* may indicate time, frequency, and/or spatial resources associated with the CLI resources. In this regard, the first control signaling 230-*a*, the second control signaling 230-*b*, or both, may indicate a set of CLI resources and corresponding Rx antenna panels 220 and/or Tx antenna panels 225 are to be used for CLI reporting. The first control signaling 230-*a*, the second control signaling 230-*b*, or both, may include RRC signaling, DCI signaling, MAC-CE signaling, or any combination thereof.

The first control signaling 230-*a* (e.g., CLI reporting configuration) may indicate any number of parameters or characteristics for measuring CLI 215 at the first UE 115-*a*. Parameters or characteristics associated with CLI reporting that may be indicated via the first control signaling 230-*a* may include, but are not limited to, beams (e.g., Rx beams) that are to be measured for CLI 215, CLI indexes, antenna group IDs, antenna panel IDs, mappings between antenna panels 220 and CLI resources, quasi co-location (QCL) indicators, SRS resource sets, or any combination thereof. Similarly, the second control signaling 230-*b* (e.g., CLI reporting configuration) may indicate any number of parameters or characteristics for transmitting reference signals 235 that will be used for CLI reporting by the first UE 115-*a*. Parameters or characteristics associated with CLI reporting that may be indicated via the second control signaling 230-*b* may include, but are not limited to, beams (e.g., Tx beams) that are to be used to transmit signals for CLI measurement, CLI indexes, antenna group IDs, antenna panel IDs, mappings between antenna panels 225 and CLI resources, SRS resource sets, or any combination thereof.

Stated differently, the network entity 105-*a* may indicate beam indication reference signals, antenna panel IDs, or both, along with a CLI-RS configuration for both the victim UE 115-*a* and the aggressor UE 115-*b*. In some aspects, each CLI resource for CLI measurement (e.g., Tx/Rx) may be associated with a beam indication reference signal and a UE panel identifier corresponding to an antenna panel 220 at the first UE 115-*a*, an antenna panel 225 at the second UE 115-*b*, or both. Antenna panel IDs may be represented by antenna group IDs, SRS resource set IDs, or both, with each set preconfigured to represent an antenna panel 220, 225, and each SRS resource per set mapped to a beam (Tx/Rx) generated by the respective antenna panel 220, 225.

For example, in some implementations, the first control signaling 230-*a* may indicate one or more beams (e.g., Rx beams) that are to be measured by the first UE 115-*a* for CLI. Additionally, or alternatively, the second control signaling 230-*b* may indicate one or more beams (e.g., Tx beams) that are to be used to transmit reference signals 235 that will be measured for CLI 215 at the first UE 115-*a*. In some cases, the one or more beams may be associated with (e.g., correspond to, generated by) the indicated set of antenna panels 220, 225 the indicated set of CLI resources, or both.

In additional or alternative implementations, the first control signaling 230-*a*, the second control signaling 230-*b*, or both, may indicate one or more CLI indexes associated with the set of CLI resources that are to be measured. In this example, each CLI index may be associated with an Rx beam at the first UE 115-*a* and a Tx beam at the second UE 115-*b*. Moreover, each CLI index may be associated with (e.g., correspond to) at least one antenna panel 220 at the first UE 115-*a*, and/or at least one antenna panel 225 at the second UE 115-*b*. For example, in some implementations, the first control signaling 230-*a*, the second control signaling 230-*b*, or both, may include or indicate a table or other data object which maps CLI resources to antenna panels 220, 225 at the first UE 115-*a*, the second UE 115-*b*, or both, as illustrated in Table 1 below:

TABLE 1

| Mappings Between CLI Indexes and Antenna Panels/Beam Pairs | |
|---|---|
| CLI Index | Tx + Rx Beam Pair |
| 1 | Tx1, Rx1 |
| 2 | Tx1, Rx2 |
| 3 | Tx2, Rx1 |
| 4 | Tx2, Rx2 |

As shown in Table 1, each CLI index (e.g., CLI resource index, CLI resource ID) may be associated with a respective Tx antenna panel 225 at the second UE 115-b, and an Rx antenna panel 220 at the first UE 115-a. In other words, each CLI index may correspond to a Tx+Rx beam pair associated with (e.g., generated by) antenna panels 220, 225 at the respective UEs 115-a, 115-b. In some aspects, the UEs 115-a, 115-b may be configured with any number of CLI indexes, and any number of antenna panels 220, 225.

In some aspects, in addition to beam indications (e.g., indications of Rx beams to be used for CLI measurement), the first control signaling 230-a, the second control signaling 230-b, or both, may indicate which antenna panels 220, 225 are to be used for CLI measurement. When indicating Rx antenna panels 220 to the Rx side (e.g., first UE 115-a), the network entity 105-a may indicate CLI measurement is to be performed by an Rx beam on a particular Rx antenna panel 220-a, 220-b. In such cases, Rx antenna panels 220 may be indicated via panel ID-based techniques, SRS resource set ID-based techniques, or both. In the context of panel ID-based techniques, respective Rx beams for CLI measurement at the first UE 115-a may be indicated (via the first control signaling 230-a) by a common QCL indicator (e.g., QCL-TypeD reference signal indicator), but with different antenna panel IDs (e.g., Panel ID 1 for the first antenna panel 220-a, Panel ID 2 for the second antenna panel 220-b). Comparatively, in the context of SRS resource set ID-based techniques, QCL indicators (e.g., QCL-TypeD reference signal indicators) for Rx beams at the first UE 115-a may be associated with (or indicated by) SRS resources that have same beam indications, but which are associated with different SRS sets mapped to the respective antenna panels 220 at the first UE 115-a.

For example, the first control signaling 230-a may indicate one or more QCL indicators (e.g., QCL-TypeD reference signal IDs) and a set of antenna panel IDs associated with the QCL indicators. In this regard, the QCL indicator may be mapped to multiple antenna panels 220. Moreover, the antenna panel IDs may be associated with (indicate) the set of antenna panels 220 at the first UE 115-a that are to be used for CLI measurement, and the QCL indicator may be associated with the CLI resources that are to be measured.

Comparatively, when indicating Tx antenna panels 225 on the Tx side, the network entity 105-a may utilize panel ID-based techniques, SRS resource set ID-based techniques, or both, to indicate (e.g., via the second control signaling 230-b) that SRSs (e.g., reference signals 235) are to be transmitted by particular antenna panels 225. In the context of panel ID-based techniques, Tx beams at the second UE 115-b may be used to transmit SRS resources for CLI measurement, where the Tx beams may be indicated by a common reference signal, but may be associated with different pane IDs (e.g., Panel ID 1 for first antenna panel 225-a, Panel ID 2 for second antenna panel 225-b). Comparatively, in the context of SRS resource set ID-based techniques, Tx beams at the second UE 115-b may be transmitted on SRS resources that have same beam indication reference signal, but which are associated with different SRS resource sets mapped to the respective antenna panels 225 (e.g., mapped to respective panel IDs).

In additional or alternative implementations, the first control signaling 230-a, the second control signaling 230-b, or both, may indicate the one or more antenna panels 220, 225 at the first UE 115-a and/or the second UE 115-b that are to be used for CLI measurement by indicating other parameters, indicators, or resources that are associated with the antenna panels 220, 225, including antenna group IDs, antenna panel IDs, SRS resource sets (e.g., SRS resource set IDs), or any combination thereof. For instance, the first control signaling 230-a may indicate one or more SRS resource sets associated with the Rx antenna panels 220 to be used at the first UE 115-a, where the SRS resource sets are associated with (e.g., include, are included within) the set of CLI resources to be measured. Similarly, the second control signaling 230-b may indicate one or more SRS resource sets associated with the Tx antenna panels 225 to be used at the second UE 115-b, where the SRS resource sets are associated with (e.g., include, are included within) the set of CLI resources to be measured.

In some implementations, the first control signaling 230-a, the second control signaling 230-b, or both, may indicate a set of mappings between the antenna panels 220, 225 at the respective UEs 115 and resources or other identifiers associated with the CLI reporting configuration. For example, in some cases, the first control signaling 230-a may indicate a set of mappings between a set of Rx antenna panels 220 at the first UE 115-a and a set of CLI resources. Additionally, or alternatively, the second control signaling 230-b may indicate a set of mappings between a set of Tx antenna panels 225 at the second UE 115-b and a set of CLI resources. The set(s) of mappings may be indicated via a table or other data object, for example, as shown in Table 1 above. In this example, the set of mappings may indicate relationships between the antenna panels 220, 225 and corresponding CLI resources. As such, indications of antenna panels 220, 225 may be mapped to corresponding CLI resources using the set of mappings, and vice versa.

In some aspects, second UE 115-b may transmit or output signals (e.g., reference signals 235) to the network entity 105-a, the first UE 115-a, or both. For example, the second UE 115-b may transmit reference signals 235 to the network entity 105-a, where at least a portion of the reference signals 235 are received or otherwise intercepted by the first UE 115-a. As such, in some cases, signals (e.g., reference signals 235) transmitted by the second UE 115-b may be intended for the network entity 105-a, but may nevertheless be received or intercepted by the first UE 115-a. The reference signals 235 may include any reference signal, including SRSs.

In some aspects, the second UE 115-b may transmit the reference signals 235 based on receiving the second control signaling 230-b (e.g., in accordance with the CLI reporting configuration indicated via the second control signaling 230-b). In particular, the second UE 115-b may transmit the reference signals 235 based on (e.g., using) the one or more Tx antenna panels 225 indicated via the second control signaling 230-b. Similarly, the first UE 115-a may receive the reference signals 235 using the one or more Rx antenna panels 220 indicated via the first control signaling 230-a. Moreover, the first UE 115-a may receive (and the second UE 115-b may transmit) the reference signals 235 within the CLI resources indicated via the second first control signaling 230-a, the second control signaling 230-b, or both.

In this regard, the first UE 115-*a* and the second UE 115-*b* may be configured to receive and transmit the reference signals 235, respectively, based on parameters or other indicators received via the first control signaling 230-*a*, the second control signaling 230-*b*, or both, including beams (e.g., Tx beams, Rx beams) that are to be used for transmitting/receiving the reference signals 235, CLI indexes, antenna group IDs, antenna panel IDs (e.g., antenna panel IDs for Tx antenna panels 220, antenna panel IDs for Rx antenna panels 225), mappings between antenna panels 220, 225 and CLI resources, SRS resource sets, QCL indicators, or any combination thereof.

The first UE 115-*a* may perform CLI measurements attributable to signals (e.g., reference signals 235) received from the second UE 115-*b*. In particular, the first UE 115-*a* may perform the CLI measurements on reference signals 235 received from the second UE 115-*b* within the set of CLI resources via the one or more Rx antenna panels 220 indicated via the first control signaling 230-*a*. Moreover, the first UE 115-*a* may be configured to receive the reference signals 235 and perform the CLI measurements based on parameters or other indicators received via the first control signaling 230-*a*, including beams (e.g., Rx beams) that are to be measured for CLI 215, CLI indexes, antenna group IDs, antenna panel IDs, mappings between antenna panels and CLI resources, QCL indicators, SRS resource sets, or any combination thereof. The CLI measurements may include RSSI measurements (e.g., CLI-RSSI), RSRP measurements (e.g., SRS-RSRP), RSRQ measurements, or any combination thereof.

Subsequently, the first UE 115-*a* may transmit or output, to the network entity 105-*a*, a CLI report 240 associated with CLI 215 experienced at the first UE 115-*a*. In other words, the first UE 115-*a* may transmit a CLI report 240 indicating the CLI measurements performed by the first UE 115-*a* on reference signals 235 received from the second UE 115-*b*. In some implementations, the first UE 115-*a* may transmit the CLI report 240 via L1 signaling, L3 signaling, or both. In this regard, in some aspects, the CLI report 240 may be transmitted via a UCI message, a MAC-CE message, or both. As described previously herein, in some cases, the use of L1 signaling for communicating CLI reports 240 may reduce a latency of CLI reporting, which may thereby result in faster and more efficient CLI mitigation at the first UE 115-*a*.

In some aspects, the first UE 115-*a* may indicate, via the CLI report 240, UE panel ID(s) associated with Rx beam(s) used for the CLI measurement. That is the first UE 115-*a* may indicate which beams and/or antenna panels 220 are associated with the reported CLI measurements. The CLI report 240 may indicate which antenna panels 220 were used for the CLI measurement by indicating antenna panel IDs, CLI resources, SRS resource sets, and the like. For example, in cases where each CLI resource is configured with beam indications and antenna panel IDs (e.g., in cases where CLI resources are mapped to specific antenna panels 220, 225 as shown in Table 1), the CLI report 240 may not be expected to indicate specific panel IDs, but may rather indicate the CLI resources (e.g., CLI resource IDs) being measured, where the CLI resources indicate the respective Rx antenna panels. For instance, in cases where CLI resources are mapped to antenna panels 220, the CLI report 240 may report CLI measurements via Table 2 below:

TABLE 2

| CLI Report - Mappings Between CLI Indexes and CLI Measurements (CLI Indexes Mapped to Corresponding Antenna Panels) | |
| --- | --- |
| CLI Index | CLI Measurements (SRS-RSSI) |
| 1 | −90 |
| 2 | −96 |
| 3 | −103 |
| 4 | −130 |

In Table 2, each CLI index (e.g., CLI resource ID) may be mapped to a respective antenna panel 220 at the first UE 115-*a*, a respective antenna panel 225-*b* at the second UE 115-*b*, or both. For example, the CLI indexes illustrated in Table 2 may be mapped to Tx/Rx antenna panels 220, 225 in accordance with Table 1 above. As such, indications of CLI indexes in the CLI report 240 may indirectly indicate which antenna panels 220, 225 are being reported via the CLI report 240. For example, based on Tables 1 and 2 above, the CLI report 240 may indicate a CLI measurement of −96 for CLI index 2, which corresponds to the first antenna panel 225-*a* (Tx1) at the second UE 115-*b* and the second antenna panel 220-*b* (Rx2) at the first UE 115-*a*.

Comparatively, in cases where each CLI resource is not configured (e.g., mapped to) corresponding antenna panels 220-, 225, it may be up to UE implementation to choose which antenna panels 220, 225 will be used for CLI measurement. Moreover, without defined mappings between CLI resources and antenna panels 220, 225, the first UE 115-*a* may be configured to include panel IDs associated with each reported measurement so that the network entity 105-*a* may determine which reported CLI measurements correspond to which beams/antenna panels 220, 225. For example, in some cases, the first UE 115-*a* may be configured to include a panel ID associated with each reported measurement, as shown in Table 3 below:

TABLE 3

| CLI Report - Mappings Between CLI Indexes, CLI Measurements, and Antenna Panels | | |
| --- | --- | --- |
| CLI Index | CLI Measurements (SRS-RSSI) | Panel ID |
| 1 | −90 | 1 |
| 2 | −96 | 2 |
| 3 | −103 | 2 |
| 4 | −130 | 2 |

As shown in Table 3 above, the CLI report 240 may include a panel ID for each reported CLI measurement. In this regard, the CLI report 240 may indicate that the first antenna panel 220-*a* (e.g., Panel ID 1) was used to measure the first CLI resource (e.g., CLI index 1), which resulted in an SRS-RSSI measurement of −90. Similarly, the CLI report 240 may indicate that the second antenna panel 220-*b* (e.g., Panel ID 2) was used to measure the second, third, and fourth CLI resources (e.g., CLI indexes 2, 3, 4), which resulted in SRS-RSSI measurements of −96, −103, and −130, respectively.

By way of another example, in cases where a single antenna panel 220 (e.g., first antenna panel 220-*a*) was used to perform CLI measurements for multiple CLI resources, the CLI report 240 may indicate a set of CLI measurements and a single antenna panel 220 (e.g., Panel ID 1) corresponding to the first antenna panel 220-*a*, as shown in Table 4 below:

TABLE 4

| | CLI Report - Mappings Between CLI Indexes,<br>CLI Measurements, and Antenna Panels | |
|---|---|---|
| CLI Index | CLI Measurements<br>(SRS-RSSI) | Panel ID |
| 1 | −90 | 1 |
| 2 | −96 | |
| 3 | −103 | |
| 4 | −130 | |

In some cases, the CLI report 240 may include an indication of the second UE 115-*b* (e.g., UE ID). In this regard, the first UE 115-*a* may transmit the CLI report 240 based on receiving the first control signaling 230-*a*, receiving the reference signals 235 from the second UE 115-*b*, performing the CLI measurements, or any combination thereof. For example, the first control signaling 230-*a* may indicate resources or transmission occasions usable for transmitting CLI reports 240, where the first UE 115-*a* transmits the CLI report 240 within the indicated resources and/or transmission occasion.

In some implementations, the network entity 105-*a* may be configured to utilize information included within the CLI report 240 (e.g., information from Tables 2-4) to reduce or mitigate CLI 215 experienced at the first UE 115-*a* by adjusting communications scheduled at the respective UEs 115-*a*, 115-*b*, such as a relative timing of uplink communications at the second UE 115-*b* and downlink communications at the first UE 115-*a*, or adjusting which antenna panels 220, 225 at the respective UEs 115-*a*, 115-*b* are used to perform scheduled communications. Additionally, or alternatively, the network entity 105-*a* may attempt to reduce or eliminate CLI 215 experienced at the first UE 115-*a* by adjusting (e.g., reducing) a transmit power used by the second UE 115-*b* to transmit uplink signals.

For example, the network entity 105-*a* may output or transmit additional control signaling to the first UE 115-*a*, the second UE 115-*b*, or both, where the additional control signaling includes scheduling information associated with wireless communications scheduled at the first UE 115-*a* and/or the second UE 115-*b*, a transmission power associated with communications transmitted by the second UE 115-*b*, or both.

For instance, the network entity 105-*a* may output (e.g., transmit) additional control signaling including scheduling information for the first UE 115-*a*, the second UE 115-*b*, or both, where the scheduling information adjusts a relative timing of downlink communications at the first UE 115-*a* and uplink communications at the second UE 115-*b* in order to reduce CLI 215 experienced at the first UE 115-*a*. Additionally, or alternatively, the additional control signaling may indicate antenna panels 220 at the first UE 115-*a* (e.g., Rx antenna panels 220), antenna panels 225 at the second UE 115-*b* (e.g., Tx antenna panels 225), or both, which exhibit or result in sufficiently low CLI 215 at the first UE 115-*a*. By way of another example, the network entity 105-*a* may output or transmit additional control signaling to the second UE 115-*b* which instructs the second UE 115-*b* to reduce a transmission power of uplink signals in order to reduce a likelihood or severity of CLI 215 experienced at the first UE 115-*a* which is attributable to the uplink signals.

Subsequently, the network entity 105-*a* may communicate with the first UE 115-*a*, the second UE 115-*b*, or both. In particular, the respective wireless devices (e.g., first UE 115-*a*, second UE 115-*b*, network entity 105-*a*) may communicate with one another based on the CLI report 240, and/or in accordance with the additional control signaling received from the network entity 105-*a* in response to the CLI report 240.

For example, the respective wireless devices may perform communications in accordance with scheduling information included within the additional control signaling responsive to the CLI report 240. For instance, in cases where the network entity 105-*a* transmits additional control signaling which indicates antenna panels 220, 225 associated with the respective UEs 115-*a*, 115-*b*, the UEs 115 may perform subsequent wireless communications based on (e.g., using) the indicated antenna panels 220, 225. By way of another example, in cases where the network entity 105-*a* transmits additional control signaling which indicates a transmission power for the second UE 115-*b*, the second UE 115-*b* may transmit uplink signals in accordance with a transmission power that was indicated via the additional control signaling. In this regard, the respective wireless devices may perform wireless communications in accordance with additional control signaling responsive to the CLI report 240 which is configured to reduce or eliminate CLI 215 experienced at the first UE 115-*a*.

Techniques described herein may support antenna panel-specific CLI reporting which enables the first UE 115-*a* (e.g., victim UE 115) to report CLI experienced at the first UE 115-*a* on a panel-by-panel basis. Accordingly, techniques described herein may improve a granularity at which CLI may be reported to the network entity 105-*a*, thereby providing the network entity 105-*a* with a more complete and comprehensive picture regarding CLI experienced at the first UE 115-*a*. Moreover, by enabling the first UE 115-*a* to report CLI experienced at specific antenna panels 220, techniques described herein may enable the network entity 105-*a* to schedule wireless communications at the UE 115-*a*, 115-*b* via antenna panels 220 that exhibit sufficient performance (e.g., low CLI), which may thereby improve an efficiency and reliability of wireless communications performed within the wireless communications system.

Figure 3:
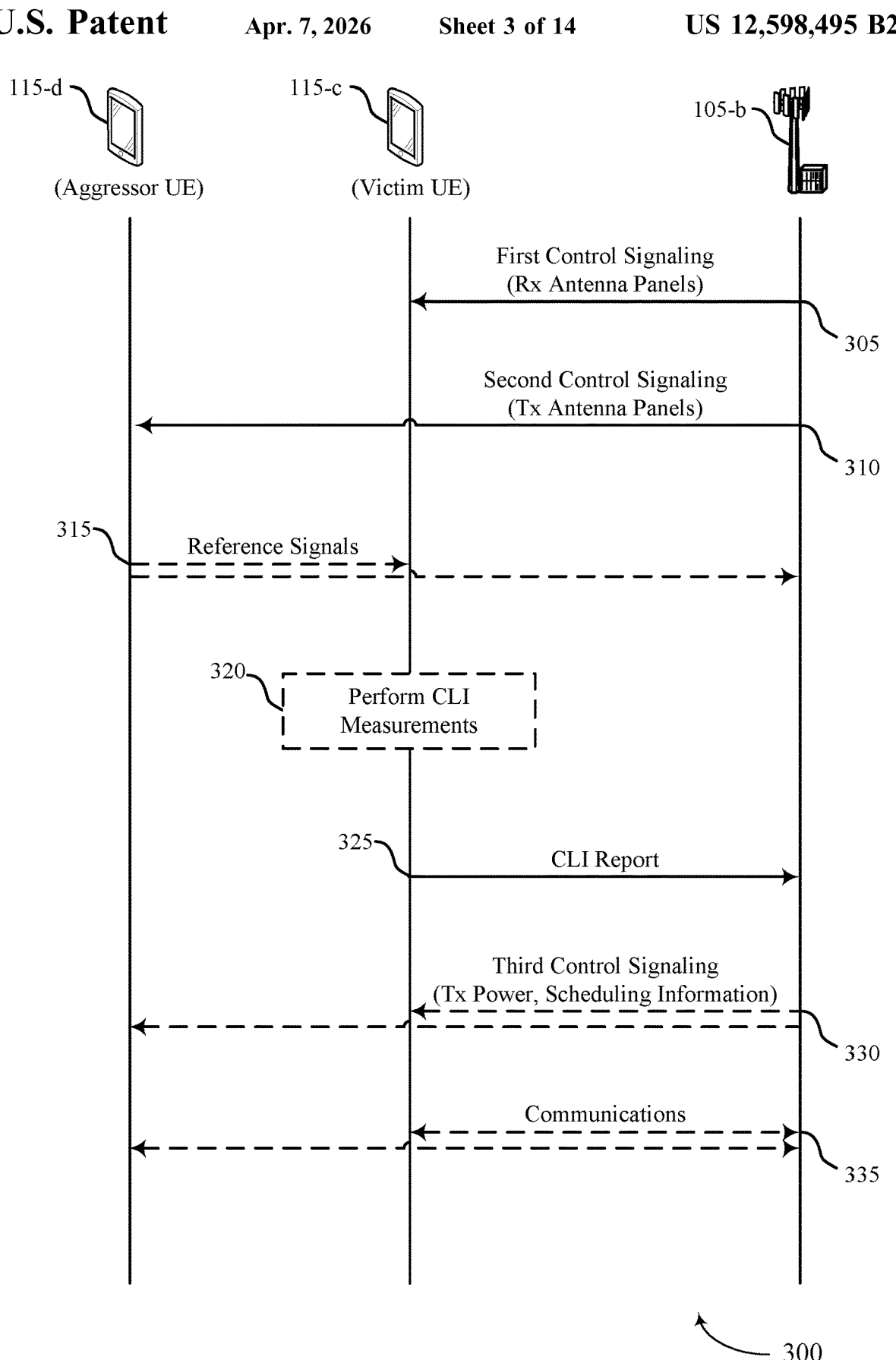
FIG. 3 illustrates an example of a process flow that supports techniques for panel-specific CLI measurement in accordance with one or more aspects of the present disclosure.

FIG. 3 illustrates an example of a process flow 300 that supports techniques for panel-specific CLI measurement in accordance with one or more aspects of the present disclosure. In some examples, aspects of the process flow 300 may implement, or be implemented by, aspects of the wireless communications system 100, the wireless communications system 200, or both. In particular, the process flow 300 illustrates a network entity 105-*b* configuring a victim UE 115-*c* and an aggressor UE 115-*b* with CLI reporting configurations for panel-specific CLI reporting, and receiving a panel-specific CLI report from the victim UE 115-*c*, as described with reference to FIGS. 1-2, among other aspects.

The process flow 300 may include a first UE 115-*c*, a second UE 115-*b*, and a network entity 105-*b*, which may be examples of UEs 115 and network entities 105 as described with reference to FIGS. 1-2. For example, the first UE 115-*c* and the second UE 115-*d* illustrated in FIG. 3 may be examples of the first UE 115-*a* and the second UE 115-*b*, respectively, as illustrated in FIG. 2. In this regard, the first UE 115-*c* may be an example of a victim UE 115, and the second UE 115-*d* may be an example of an aggressor UE 115. Similarly, the network entity 105-*b* illustrated in FIG. 3 may be an example of the network entity 105-*a* illustrated in FIG. 2.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 305, the network entity 105-*b* may output (e.g., transmit) first control signaling to the first UE 115-*c*. In some aspects, the first control signaling may include or indicate a CLI reporting configuration including parameters, resources, and/or characteristics for CLI reporting. In particular, the first control signaling may indicate a set of antenna panels (e.g., set of Rx antenna panels) of the first UE 115-*c* usable for measuring CLI experienced within a set of CLI resources. In some cases, the first control signaling may indicate time, frequency, and/or spatial resources associated with the CLI resources. In this regard, the first control signaling may indicate a set of CLI resources and corresponding Rx antenna panels are to be used for CLI reporting. The first control signaling may include RRC signaling, DCI signaling, MAC-CE signaling, or any combination thereof.

The first control signaling (e.g., CLI reporting configuration) may indicate any number of parameters or characteristics for measuring CLI at the first UE 115-*c*. Parameters or characteristics associated with CLI reporting that may be indicated via the first control signaling may include, but are not limited to, beams (e.g., Rx beams) that are to be measured for CLI, CLI indexes, antenna group IDs, antenna panel IDs, mappings between antenna panels and CLI resources, QCL indicators, SRS resource sets, or any combination thereof.

For example, in some implementations, the first control signaling may indicate one or more beams (e.g., Rx beams) that are to be measured by the first UE 115-*c* for CLI. In some cases, the one or more beams may be associated with (e.g., correspond to, generated by) the indicated set of antenna panels, the indicated set of CLI resources, or both. By way of another example, the first control signaling may indicate one or more CLI indexes associated with the set of CLI resources that are to be measured. In this example, each CLI index may be associated with an Rx beam at the first UE 115-*c* and a Tx beam at the second UE, as illustrated in Table 1 above. Moreover, each CLI index may be associated with (e.g., correspond to) at least one antenna panel at the first UE 115-*c*.

By way of another example, the first control signaling may indicate the one or more antenna panels at the first UE 115-*c* that are to be used for CLI measurement by indicating other parameters, indicators, or resources that are associated with the antenna panels, including antenna group IDs, antenna panel IDs, SRS resource sets (e.g., SRS resource set IDs), or any combination thereof. For instance, the first control signaling at 305 may indicate one or more SRS resource sets associated with the Rx antenna panels to be used at the first UE 115-*c*, where the SRS resource sets are associated with (e.g., include, are included within) the set of CLI resources to be measured.

In additional or alternative implementations, the first control signaling may indicate one or more QCL indicators (e.g., QCL-TypeD reference signal IDs) and a set of antenna panel IDs associated with the QCL indicators. In this regard, the QCL indicator may be mapped to multiple antenna panels. Moreover, the antenna panel IDs may be associated with (indicate) the set of antenna panels at the first UE 115-*c* that are to be used for CLI measurement, and the QCL indicator may be associated with the CLI resources that are to be measured.

In some implementations, the first control signaling may indicate a set of mappings between the antenna panels at the first UE 115-*c* and resources or other identifiers associated with the CLI reporting configuration. For example, in some cases, the first control signaling may indicate a set of mappings between a set of antenna panels at the first UE 115-*c* and a set of CLI resources. The set of mappings may be indicated via a table or other data object. In this example, the set of mappings may indicate relationships between the antenna panels and corresponding CLI resources. As such, indications of antenna panels may be mapped to corresponding CLI resources using the set of mappings, and vice versa.

At 310, the network entity 105-*b* may output (e.g., transmit) second control signaling to the second UE 115-*d*. As noted previously herein with respect to the first control signaling at 305, the second control signaling at 310 may include or indicate a CLI reporting configuration including parameters, resources, and/or characteristics for CLI reporting. In particular, the second control signaling may indicate a set of antenna panels (e.g., set of Tx antenna panels) of the second UE 115-*d* usable for transmitting signals within a set of CLI resources that will be used for CLI measurement at the first UE 115-*c*. In some cases, the second control signaling may indicate time, frequency, and/or spatial resources associated with the CLI resources. In this regard, the second control signaling may indicate a set of CLI resources and corresponding Tx antenna panels are to be used for transmitting signals (e.g., reference signals, SRSs) for CLI reporting by the first UE 115-*c*. The second control signaling may include RRC signaling, DCI signaling, MAC-CE signaling, or any combination thereof.

As noted previously herein with respect to the first control signaling at 305, the second control signaling at 310 may indicate any number of parameters or characteristics for transmitting signals by the second UE 115-*d* which will be used for CLI reporting at the first UE 115-*c*. Parameters or characteristics associated with CLI reporting that may be indicated via the second control signaling may include, but are not limited to, beams (e.g., Tx beams) that are to be used for transmitting signals for CLI measurement, CLI indexes, antenna group IDs, antenna panel IDs, mappings between antenna panels and CLI resources, SRS resource sets, or any combination thereof. In this regard, any indications or parameters described with respect to the first control signaling at 305 used to indicate Rx antenna panels and corresponding resources may additionally or alternatively apply to the second control signaling at 310 used to indicate Tx antenna panels and corresponding resources for CLI measurement.

At 315, the second UE 115-*d* may output or transmit signals (e.g., reference signals) to the network entity 105-*b*, the first UE 115-*c*, or both. For example, the second UE 115-*d* may transmit reference signals to the network entity 105-*b*, where at least a portion of the reference signals are received or otherwise intercepted by the first UE 115-*c*. As such, in some cases, signals transmitted by the second UE 115-*d* at 315 may be intended for the network entity 105-*b*, but may nevertheless be received or intercepted by the first UE 115-*c*. The reference signals may include any reference signal, including SRSs.

In some aspects, the second UE 115-*d* may transmit the reference signals at 315 based on receiving the second control signaling at 310 (e.g., in accordance with the CLI reporting configuration indicated via the second control signaling). In particular, the second UE 115-*d* may transmit the reference signals at 315 based on (e.g., using) the one or more Tx antenna panels indicated via the second control signaling. Moreover, the second UE 115-*d* may transmit the reference signals within the CLI resources indicated via the second control signaling. In this regard, the second UE 115-*d* may be configured to transmit the signals at 315 based on parameters or other indicators received via the second control signaling at 310, including beams (e.g., Tx beams) that are to be used for transmitting the signals, CLI indexes, antenna group IDs, antenna panel IDs, mappings between antenna panels and CLI resources, SRS resource sets, or any combination thereof. Similarly, the first UE 115-*c* may receive the reference signals at 315 based on (e.g., using) the Rx antenna panels indicated via the first control signaling at 305, and within the set of indicated CLI resources.

At 320, the first UE 115-*c* may perform CLI measurements attributable to signals received from the second UE 115-*d* at 315. In particular, the first UE 115-*c* may perform the CLI measurements on signals received from the second UE 115-*d* within the set of CLI resources via the one or more Rx antenna panels indicated via the first control signaling 230-*a*. In this regard, the first UE 115-*c* may perform CLI measurements based on receiving the first control signaling at 305, and receiving/intercepting the reference signals at 315. Moreover, the first UE 115-*c* may be configured to receive the signals at 315 and perform the CLI measurements at 320 based on parameters or other indicators received via the first control signaling at 305, including beams (e.g., Rx beams) that are to be measured for CLI, CLI indexes, antenna group IDs, antenna panel IDs, mappings between antenna panels and CLI resources, QCL indicators, SRS resource sets, or any combination thereof. The CLI measurements may include RSSI measurements (e.g., CLI-RSSI), RSRP measurements (e.g., SRS-RSRP), RSRQ measurements, or any combination thereof.

At 325, the first UE 115-*c* may output or transmit, to the network entity 105-*b*, a CLI report associated with CLI experienced at the first UE 115-*c*. In other words, the first UE 115-*c* may transmit (and the network entity 105-*b* may obtain or receive) a CLI report indicating the CLI measurements which were performed at 320. For example, the first UE 115-*c* may transmit, via the CLI report, a set of CLI measurements performed at 320 and a set of antenna panel IDs corresponding to the set of CLI measurements and the respective antenna panels at the first UE 115-*c* (e.g., first CLI measurement-first antenna panel ID; second CLI measurement-second antenna panel ID). By way of another example, in cases where a single antenna panel was used to perform CLI measurements for multiple CLI resources, the CLI report may indicate a set of CLI measurements and a single antenna panel ID (or other identifier) corresponding to the respective antenna panel.

In some implementations, the network entity 105-*b* may be configured to utilize information included within the CLI report to reduce or mitigate CLI experienced at the first UE 115-*c* by adjusting communications scheduled at the respective UEs 115-*c*, 115-*d*, such as a relative timing of uplink communications at the second UE 115-*d* and downlink communications at the first UE 115-*c*, or adjusting which antenna panels at the respective UEs 115-*c*, 115-*d* are used to perform scheduled communications. Additionally, or alternatively, the network entity 105-*b* may attempt to reduce or eliminate CLI experienced at the first UE 115-*c* by adjusting (e.g., reducing) a transmit power used by the second UE 115-*d* to transmit uplink signals.

In some cases, the CLI report may include an indication of the second UE 115-*d* (e.g., UE ID). In this regard, the first UE 115-*c* may transmit the CLI report at 325 based on receiving the first control signaling at 305, receiving the reference signals from the second UE 115-*d* at 315, performing the CLI measurements at 320, or any combination thereof. For example, the first control signaling 305 may indicate resources or transmission occasions usable for transmitting CLI reports, where the first UE 115-*c* transmits the CLI report within the indicated resources and/or transmission occasion.

In some aspects, the CLI report may indicate the one or more antenna panels associated with the CLI report/CLI measurements. In other words, the CLI report may indicate which Rx antenna panels were used for the CLI measurements, and therefore which Rx antenna panels are being used for CLI reporting. The CLI report may indicate which antenna panels are being reported by explicitly indicating the respective antenna panels (e.g., antenna panel IDs), by indicating CLI resources (or other parameters/indicators) associated with the respective antenna panels, or both. For example, in cases where each CLI resource is already associated with (e.g., mapped to) a corresponding antenna panel, the CLI report may indicate which CLI resources are being reported, which may indirectly indicate which antenna panels were used for the CLI measurements. Comparatively, in cases where antenna panels are not explicitly mapped to CLI resources, the CLI report may explicitly indicate which antenna panels (and corresponding CLI resources) are associated with the reported CLI measurements.

In some implementations, the first UE 115-*c* may transmit the CLI report via L1 signaling, L3 signaling, or both. In this regard, in some aspects, the CLI report at 325 may be transmitted via a UCI message, a MAC-CE message, or both. As described previously herein, in some cases, the use of L1 signaling for communicating CLI reports may reduce a latency of CLI reporting, which may thereby result in faster and more efficient CLI mitigation at the first UE 115-*c*.

At 330, the network entity 105-*b* may output or transmit third control signaling to the first UE 115-*c*, the second UE 115-*d*, or both. The network entity 105-*b* may transmit the third control signaling based on transmitting the first control signaling at 305, transmitting the second control signaling at 310, receiving the CLI report at 325, or any combination thereof. In particular, in some implementation, the network entity 105-*b* may transmit the third control signaling in response to the CLI report in an attempt to reduce or eliminate CLI experienced at the first UE 115-*c*.

For example, the third control signaling may include scheduling information associated with wireless communications scheduled at the first UE 115-*c* and/or the second UE 115-*d*, a transmission power associated with communications transmitted by the second UE 115-*d*, or both. For instance, the third control signaling may include scheduling information for the first UE 115-*c*, the second UE 115-*d*, or both, where the scheduling information adjusts a relative timing of downlink communications at the first UE 115-*c* and uplink communications at the second UE 115-*d* in order to reduce CLI experienced at the first UE 115-*c*. Additionally, or alternatively, the third control signaling may indicate antenna panels at the first UE 115-*c* (e.g., Rx antenna panels), the second UE 115-*d* (e.g., Tx antenna panels), or both, which exhibit or result in sufficiently low CLI at the first UE 115-*c*. By way of another example, the third control signaling may instruct the second UE 115-*d* to reduce a transmission power of uplink signals in order to reduce a likelihood or severity of CLI experienced at the first UE 115-*c* which is attributable to the uplink signals.

At 335, the network entity 105-*b* may communicate with the first UE 115-*c*, the second UE 115-*d*, or both. In particular, the respective wireless devices (e.g., first UE 115-c, second UE 115-d, network entity 105-b) may perform communications at 335 based on the CLI report at 325, and/or in accordance with the third control signaling at 330.

For example, the respective wireless devices may perform communications in accordance with scheduling information included within the third control signaling. For instance, in cases where the third control signaling indicates Tx/Rx antenna panels associated with the respective UEs 115-c, 115-d, the UEs 115 may perform the wireless communications at 335 based on (e.g., using) the indicated antenna panels. By way of another example, in cases where the third control signaling indicates a transmission power for the second UE 115-d, the second UE 115-d may transmit uplink signals in accordance with a transmission power that was indicated via the third control signaling. In this regard, the respective wireless devices may perform wireless communications in accordance with the third control signaling which is configured to reduce or eliminate CLI experienced at the first UE 115-c.

Techniques described herein may support antenna panel-specific CLI reporting which enables the first UE 115-c (e.g., victim UE 115) to report CLI experienced at the first UE 115-c on a panel-by-panel basis. Accordingly, techniques described herein may improve a granularity at which CLI may be reported to the network entity 105-b, thereby providing the network entity 105-b with a more complete and comprehensive picture regarding CLI experienced at the first UE 115-c. Moreover, by enabling the first UE 115-c to report CLI experienced at specific antenna panels, techniques described herein may enable the network entity 105-b to schedule wireless communications at the UE 115-c, 115-d via antenna panels that exhibit sufficient performance (e.g., low CLI), which may thereby improve an efficiency and reliability of wireless communications performed within the wireless communications system.

Figure 4:
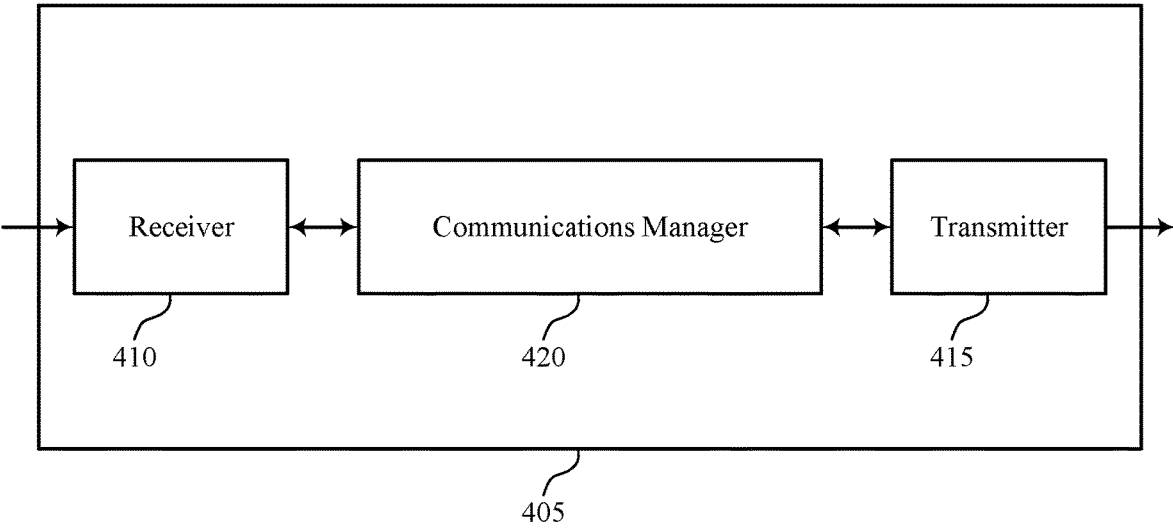
FIGS. 4 and 5 show block diagrams of devices that support techniques for panel-specific CLI measurement in accordance with one or more aspects of the present disclosure.

FIG. 4 shows a block diagram 400 of a device 405 that supports techniques for panel-specific CLI measurement in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for panel-specific CLI measurement). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for panel-specific CLI measurement). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for panel-specific CLI measurement as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a first UE in accordance with examples as disclosed herein. For example, the communications manager 420 may be configured as or otherwise support a means for receiving control signaling identifying a set of antenna panels of the first UE usable for measuring CLI experienced within a set of CLI resources. The communications manager 420 may be configured as or otherwise support a means for performing CLI measurements on signals received from a second UE via the set of CLI resources and the set of antenna panels. The communications manager 420 may be configured as or otherwise support a means for transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

Additionally, or alternatively, the communications manager 420 may support wireless communication at a second UE in accordance with examples as disclosed herein. For example, the communications manager 420 may be configured as or otherwise support a means for receiving control signaling indicating a set of antenna panels of the second UE usable for transmitting signals within a set of CLI resources. The communications manager 420 may be configured as or otherwise support a means for transmitting signals via the set of CLI resources and the set of antenna panels based on the control signaling. The communications manager 420 may be configured as or otherwise support a means for receiving, based on transmitting the signals, additional control signaling including scheduling information associated with communications at the second UE, a transmission power associated with communications transmitted by the second UE, or a combination thereof.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for antenna panel-specific CLI reporting which enables UEs 115 to report CLI experienced at the respective UEs 115 on a panel-by-panel basis. Accordingly, techniques described herein may improve a granularity at which CLI may be reported to the network, thereby providing the network with a more complete and comprehensive picture regarding CLI experienced at the respective UEs 115. Moreover, by enabling UEs 115 to report CLI experienced at specific antenna panels, techniques described herein may enable the network to schedule wireless communications at UEs 115 via antenna panels that exhibit sufficient performance (e.g., low CLI), which may thereby improve an efficiency and reliability of wireless communications performed within the wireless communications system. Further, by decreasing CLI experienced within the wireless communications system, techniques described herein may reduce the quantity of retransmissions, thereby reducing power consumption at the UEs 115 and leading to a more efficient utilization of communication resources.

Figure 5:
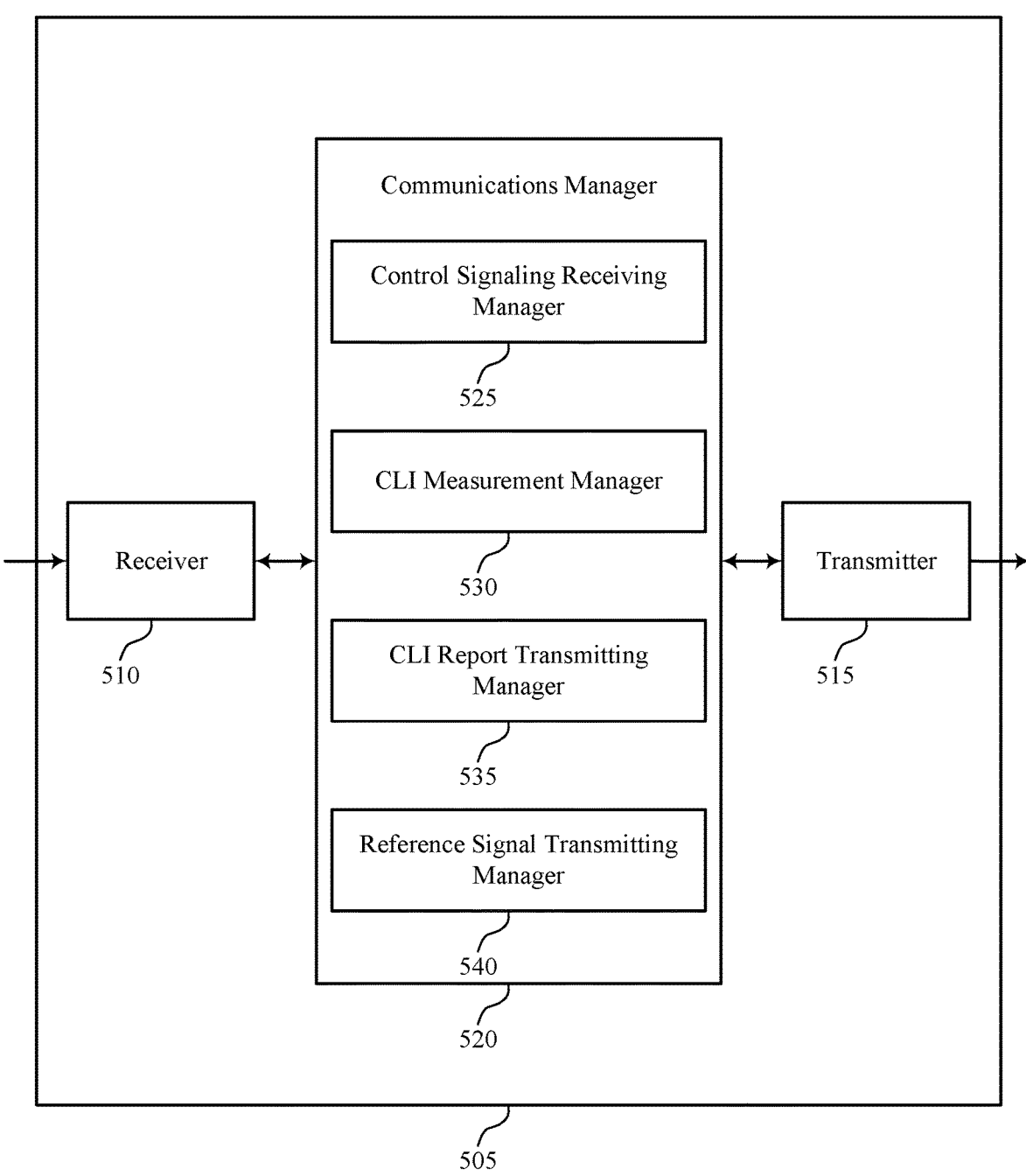

FIG. 5 shows a block diagram 500 of a device 505 that supports techniques for panel-specific CLI measurement in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for panel-specific CLI measurement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for panel-specific CLI measurement). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for panel-specific CLI measurement as described herein. For example, the communications manager 520 may include a control signaling receiving manager 525, a CLI measurement manager 530, a CLI report transmitting manager 535, a reference signal transmitting manager 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. The control signaling receiving manager 525 may be configured as or otherwise support a means for receiving control signaling identifying a set of antenna panels of the first UE usable for measuring CLI experienced within a set of CLI resources. The CLI measurement manager 530 may be configured as or otherwise support a means for performing CLI measurements on signals received from a second UE via the set of CLI resources and the set of antenna panels. The CLI report transmitting manager 535 may be configured as or otherwise support a means for transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

Additionally, or alternatively, the communications manager 520 may support wireless communication at a second UE in accordance with examples as disclosed herein. The control signaling receiving manager 525 may be configured as or otherwise support a means for receiving control signaling indicating a set of antenna panels of the second UE usable for transmitting signals within a set of CLI resources. The reference signal transmitting manager 540 may be configured as or otherwise support a means for transmitting signals via the set of CLI resources and the set of antenna panels based on the control signaling. The control signaling receiving manager 525 may be configured as or otherwise support a means for receiving, based on transmitting the signals, additional control signaling including scheduling information associated with communications at the second UE, a transmission power associated with communications transmitted by the second UE, or a combination thereof.

Figure 6:
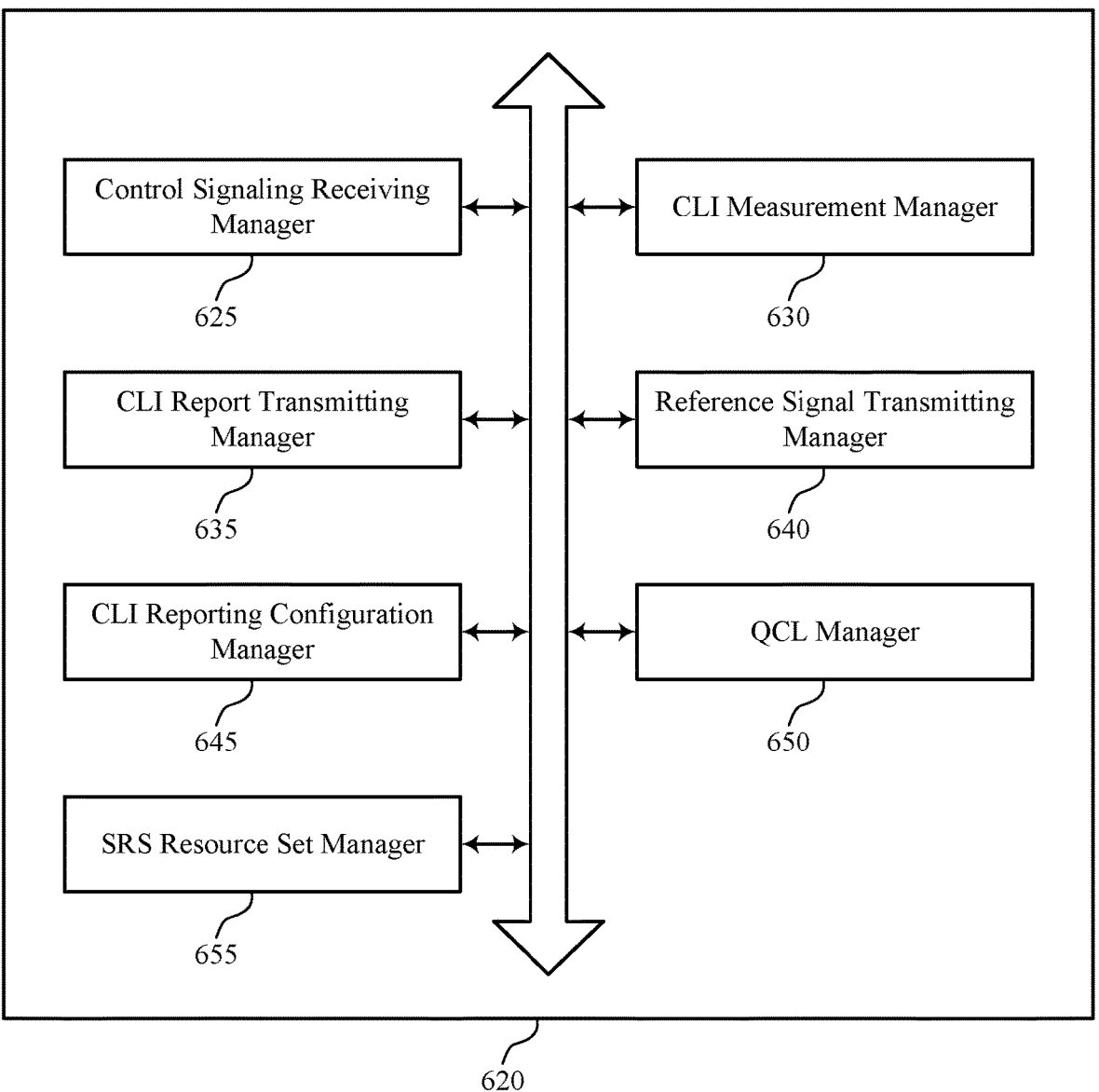
FIG. 6 shows a block diagram of a communications manager that supports techniques for panel-specific CLI measurement in accordance with one or more aspects of the present disclosure.

FIG. 6 shows a block diagram 600 of a communications manager 620 that supports techniques for panel-specific CLI measurement in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for panel-specific CLI measurement as described herein. For example, the communications manager 620 may include a control signaling receiving manager 625, a CLI measurement manager 630, a CLI report transmitting manager 635, a reference signal transmitting manager 640, a CLI reporting configuration manager 645, a QCL manager 650, an SRS resource set manager 655, or any combination thereof. Each of these components may communicate, directly or indirectly, with one another (e.g., via one or more buses).

The communications manager 620 may support wireless communication at a first UE in accordance with examples as disclosed herein. The control signaling receiving manager 625 may be configured as or otherwise support a means for receiving control signaling identifying a set of antenna panels of the first UE usable for measuring CLI experienced within a set of CLI resources. The CLI measurement manager 630 may be configured as or otherwise support a means for performing CLI measurements on signals received from a second UE via the set of CLI resources and the set of antenna panels. The CLI report transmitting manager 635 may be configured as or otherwise support a means for transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

In some examples, the CLI reporting configuration manager 645 may be configured as or otherwise support a means for receiving, via the control signaling, an indication of one or more beams to be measured for CLI, the one or more beams associated with the set of antenna panels, the set of CLI resources, or both, where CLI measurements are associated with the one or more beams.

In some examples, the CLI reporting configuration manager 645 may be configured as or otherwise support a means for receiving, via the control signaling, one or more CLI indexes associated with the set of CLI resources, where each CLI index is associated with a receive beam at the first UE and a transmit beam at the second UE, where performing the CLI measurements is based on the one or more CLI indexes.

In some examples, each CLI index is associated with at least one antenna panel of the set of antenna panels.

In some examples, the CLI reporting configuration manager 645 may be configured as or otherwise support a means for receiving, via the control signaling, one or more antenna group identifiers associated with the set of antenna panels, one or more SRS resource set identifiers associated with the set of antenna panels, or both, where performing the CLI measurements is based on the one or more antenna group identifiers, the one or more SRS resource set identifiers, or both.

In some examples, the CLI reporting configuration manager 645 may be configured as or otherwise support a means for receiving, via the control signaling, a set of mappings between the set of antenna panels and the set of CLI resources, the set of mappings including a mapping between the antenna panel and a CLI resource from the set of CLI resources corresponding to the antenna panel. In some examples, the CLI report transmitting manager 635 may be configured as or otherwise support a means for transmitting, via the CLI report and based on the mapping, an indication of the CLI resource corresponding to the antenna panel.

In some examples, the CLI report transmitting manager 635 may be configured as or otherwise support a means for transmitting, via the CLI report, a set of multiple CLI measurements and a set of multiple antenna panel identifiers corresponding to the respective set of multiple CLI measurements, where the set of multiple antenna panel identifiers are associated with the set of antenna panels.

In some examples, the CLI report transmitting manager 635 may be configured as or otherwise support a means for transmitting, via the CLI report, a set of multiple CLI measurements and an antenna panel identifier associated with the antenna panel, where the antenna panel identifier corresponds to the set of multiple CLI measurements.

In some examples, the QCL manager 650 may be configured as or otherwise support a means for receiving, via the control signaling, an indication of a QCL indicator and a set of antenna panel identifiers associated with the QCL indicator, the set of antenna panel identifiers corresponding to the set of antenna panels, and the QCL indicator associated with the set of CLI resources, where performing the CLI measurements is based on the QCL indicator and the set of antenna panel identifiers.

In some examples, the SRS resource set manager 655 may be configured as or otherwise support a means for receiving, via the control signaling, an indication of one or more SRS resource sets associated with the set of antenna panels, the one or more SRS resource sets associated with the set of CLI resources, where performing the CLI measurements is based on the one or more SRS resource sets.

In some examples, the CLI report is transmitted via L1 signaling. In some examples, the signals received from the second UE include SRSs.

Additionally, or alternatively, the communications manager 620 may support wireless communication at a second UE in accordance with examples as disclosed herein. In some examples, the control signaling receiving manager 625 may be configured as or otherwise support a means for receiving control signaling indicating a set of antenna panels of the second UE usable for transmitting signals within a set of CLI resources. The reference signal transmitting manager 640 may be configured as or otherwise support a means for transmitting signals via the set of CLI resources and the set of antenna panels based on the control signaling. In some examples, the control signaling receiving manager 625 may be configured as or otherwise support a means for receiving, based on transmitting the signals, additional control signaling including scheduling information associated with communications at the second UE, a transmission power associated with communications transmitted by the second UE, or a combination thereof.

In some examples, the CLI reporting configuration manager 645 may be configured as or otherwise support a means for receiving, via the control signaling, an indication of one or more beams usable for transmitting the signals, the one or more beams associated with the set of antenna panels, the set of CLI resources, or both, where transmitting the signals is based on the one or more beams.

In some examples, the CLI reporting configuration manager 645 may be configured as or otherwise support a means for receiving, via the control signaling, one or more CLI indexes associated with the set of CLI resources, where each CLI index is associated with a transmit beam at the second UE and a receive beam at a first UE, where the signals are transmitted to the first UE based on the one or more CLI indexes.

In some examples, each CLI index is associated with at least one antenna panel of the set of antenna panels.

In some examples, the CLI reporting configuration manager 645 may be configured as or otherwise support a means for receiving, via the control signaling, one or more antenna group identifiers associated with the set of antenna panels, one or more SRS resource set identifiers associated with the set of antenna panels, or both, where transmitting the signals is based on the one or more antenna group identifiers, the one or more SRS resource set identifiers, or both.

In some examples, the CLI reporting configuration manager 645 may be configured as or otherwise support a means for receiving, via the control signaling, an indication of one or more transmit beams and a set of antenna panel identifiers associated with the one or more transmit beams, the set of antenna panel identifiers corresponding to the set of antenna panels, and the one or more transmit beams associated with the set of CLI resources, where transmitting the signals is based on the one or more transmit beams and the set of antenna panel identifiers.

In some examples, the SRS resource set manager 655 may be configured as or otherwise support a means for receiving, via the control signaling, an indication of one or more SRS resource sets associated with the set of antenna panels, the one or more SRS resource sets associated with the set of CLI resources, where transmitting the signals is based on the one or more SRS resource sets.

In some examples, the signals transmitted via the set of CLI resources include SRSs.

Figure 7:
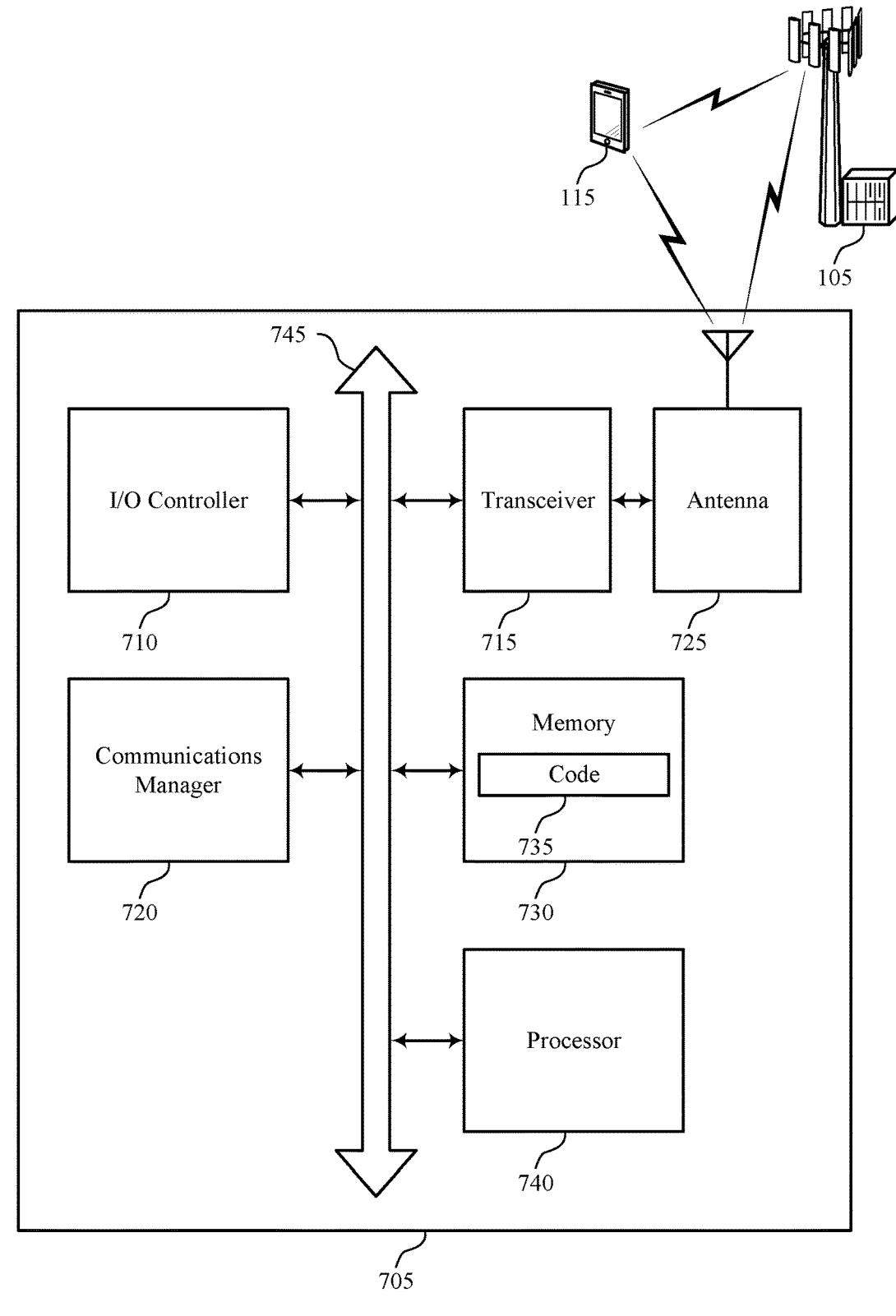
FIG. 7 shows a diagram of a system including a device that supports techniques for panel-specific CLI measurement in accordance with one or more aspects of the present disclosure.

FIG. 7 shows a diagram of a system 700 including a device 705 that supports techniques for panel-specific CLI measurement in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for panel-specific CLI measurement). For example, the device 705 or a component of the device 705 may include a processor 740 and memory 730 coupled with or to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for receiving control signaling identifying a set of antenna panels of the first UE usable for measuring CLI experienced within a set of CLI resources. The communications manager 720 may be configured as or otherwise support a means for performing CLI measurements on signals received from a second UE via the set of CLI resources and the set of antenna panels. The communications manager 720 may be configured as or otherwise support a means for transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof.

Additionally, or alternatively, the communications manager 720 may support wireless communication at a second UE in accordance with examples as disclosed herein. For example, the communications manager 720 may be configured as or otherwise support a means for receiving control signaling indicating a set of antenna panels of the second UE usable for transmitting signals within a set of CLI resources. The communications manager 720 may be configured as or otherwise support a means for transmitting signals via the set of CLI resources and the set of antenna panels based on the control signaling. The communications manager 720 may be configured as or otherwise support a means for receiving, based on transmitting the signals, additional control signaling including scheduling information associated with communications at the second UE, a transmission power associated with communications transmitted by the second UE, or a combination thereof.

By including or configuring the communications manager 720 in accordance with examples as described herein, the device 705 may support techniques for antenna panel-specific CLI reporting which enables UEs 115 to report CLI experienced at the respective UEs 115 on a panel-by-panel basis. Accordingly, techniques described herein may improve a granularity at which CLI may be reported to the network, thereby providing the network with a more complete and comprehensive picture regarding CLI experienced at the respective UEs 115. Moreover, by enabling UEs 115 to report CLI experienced at specific antenna panels, techniques described herein may enable the network to schedule wireless communications at UEs 115 via antenna panels that exhibit sufficient performance (e.g., low CLI), which may thereby improve an efficiency and reliability of wireless communications performed within the wireless communications system. Further, by decreasing CLI experienced within the wireless communications system, techniques described herein may reduce the quantity of retransmissions, thereby reducing power consumption at the UEs 115 and leading to a more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for panel-specific CLI measurement as described herein, or the processor 740 and the memory 730 may be otherwise configured to perform or support such operations.

Figure 8:
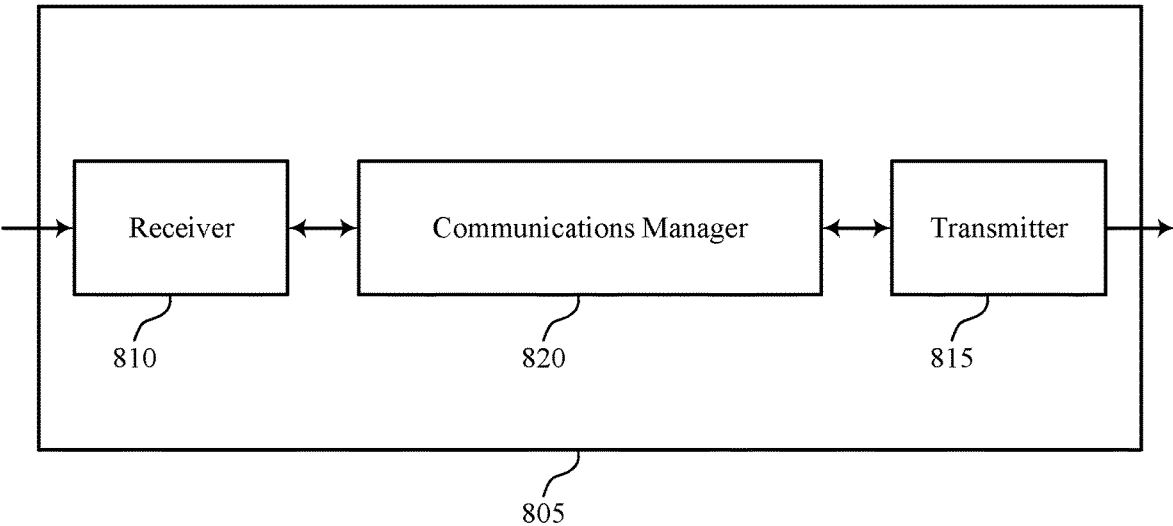
FIGS. 8 and 9 show block diagrams of devices that support techniques for panel-specific CLI measurement in accordance with one or more aspects of the present disclosure.

FIG. 8 shows a block diagram 800 of a device 805 that supports techniques for panel-specific CLI measurement in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for panel-specific CLI measurement as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting, to a first UE, control signaling indicating a set of antenna panels of the first UE usable for measuring CLI experienced within a set of CLI resources. The communications manager 820 may be configured as or otherwise support a means for receiving, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof. The communications manager 820 may be configured as or otherwise support a means for communicating with the first UE, the second UE, or both, based on the CLI report.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for antenna panel-specific CLI reporting which enables UEs 115 to report CLI experienced at the respective UEs 115 on a panel-by-panel basis. Accordingly, techniques described herein may improve a granularity at which CLI may be reported to the network, thereby providing the network with a more complete and comprehensive picture regarding CLI experienced at the respective UEs 115. Moreover, by enabling UEs 115 to report CLI experienced at specific antenna panels, techniques described herein may enable the network to schedule wireless communications at UEs 115 via antenna panels that exhibit sufficient performance (e.g., low CLI), which may thereby improve an efficiency and reliability of wireless communications performed within the wireless communications system. Further, by decreasing CLI experienced within the wireless communications system, techniques described herein may reduce the quantity of retransmissions, thereby reducing power consumption at the UEs 115 and leading to a more efficient utilization of communication resources.

Figure 9:
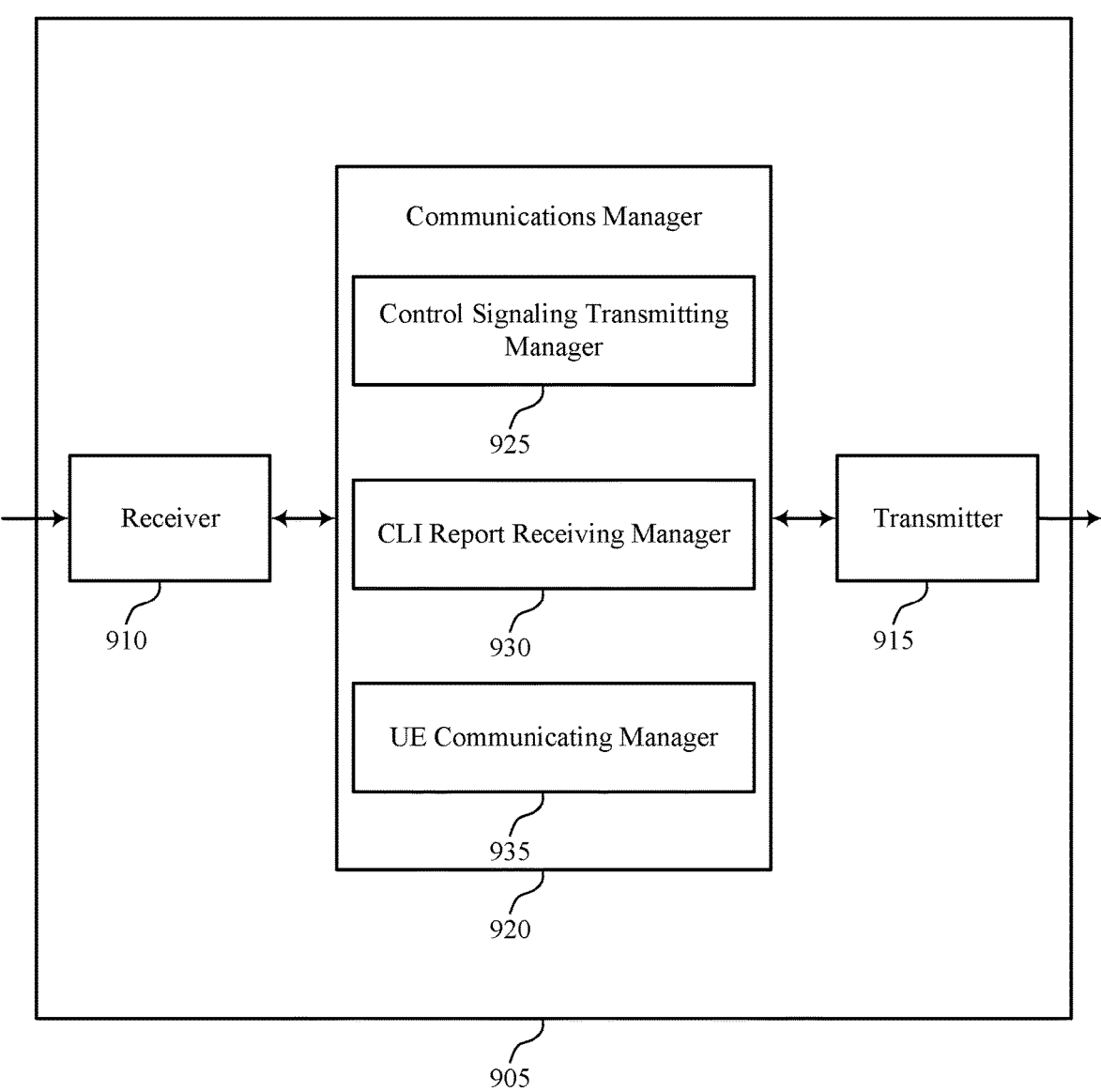

FIG. 9 shows a block diagram 900 of a device 905 that supports techniques for panel-specific CLI measurement in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for panel-specific CLI measurement as described herein. For example, the communications manager 920 may include a control signaling transmitting manager 925, a CLI report receiving manager 930, a UE communicating manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The control signaling transmitting manager 925 may be configured as or otherwise support a means for transmitting, to a first UE, control signaling indicating a set of antenna panels of the first UE usable for measuring CLI experienced within a set of CLI resources. The CLI report receiving manager 930 may be configured as or otherwise support a means for receiving, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof. The UE communicating manager 935 may be configured as or otherwise support a means for communicating with the first UE, the second UE, or both, based on the CLI report.

Figure 10:
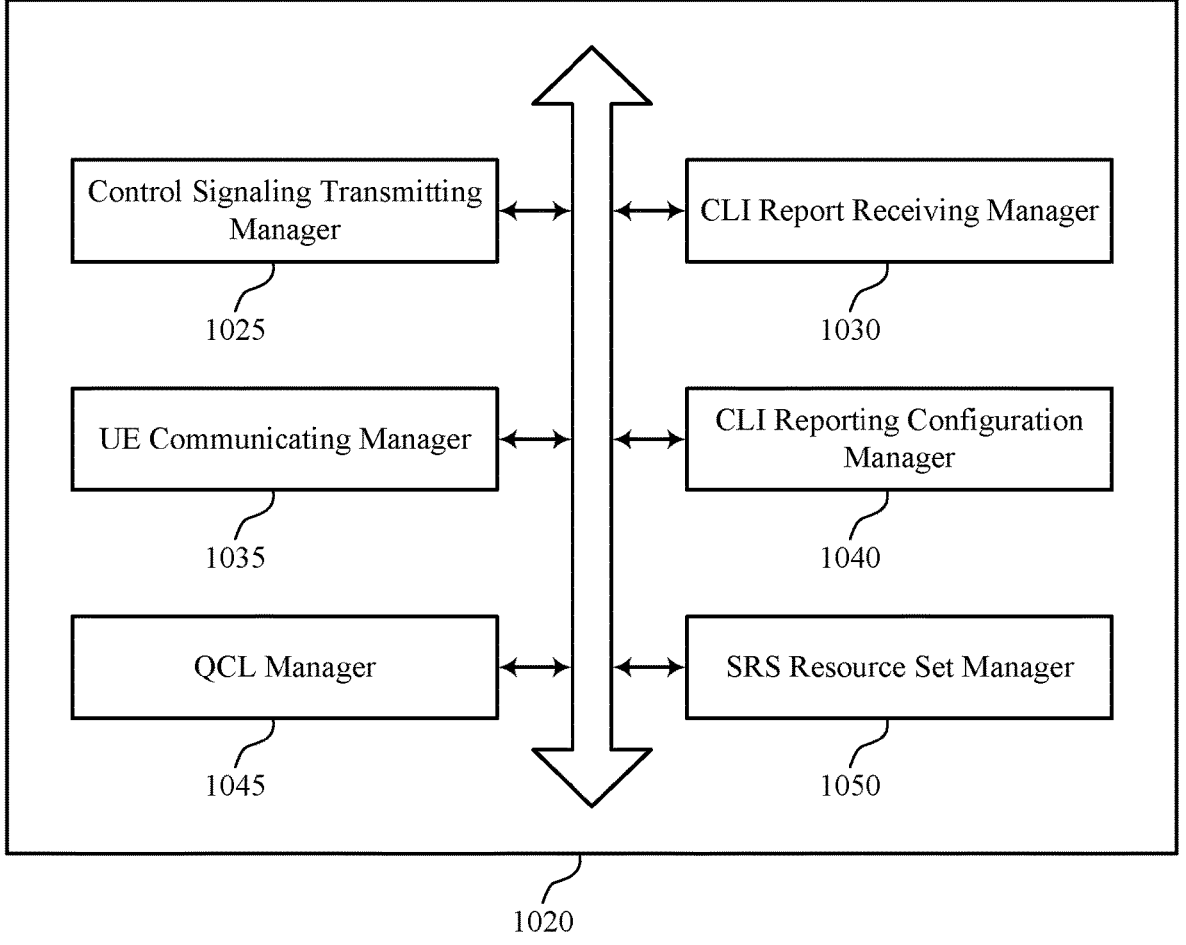
FIG. 10 shows a block diagram of a communications manager that supports techniques for panel-specific CLI measurement in accordance with one or more aspects of the present disclosure.

FIG. 10 shows a block diagram 1000 of a communications manager 1020 that supports techniques for panel-specific CLI measurement in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for panel-specific CLI measurement as described herein. For example, the communications manager 1020 may include a control signaling transmitting manager 1025, a CLI report receiving manager 1030, a UE communicating manager 1035, a CLI reporting configuration manager 1040, a QCL manager 1045, an SRS resource set manager 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The control signaling transmitting manager 1025 may be configured as or otherwise support a means for transmitting, to a first UE, control signaling indicating a set of antenna panels of the first UE usable for measuring CLI experienced within a set of CLI resources. The CLI report receiving manager 1030 may be configured as or otherwise support a means for receiving, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof. The UE communicating manager 1035 may be configured as or otherwise support a means for communicating with the first UE, the second UE, or both, based on the CLI report.

In some examples, the CLI reporting configuration manager 1040 may be configured as or otherwise support a means for transmitting, to the second UE, additional control signaling indicating a second set of antenna panels of the second UE usable for transmitting the signals to the first UE within the set of CLI resources, where receiving the CLI report is based on transmitting the additional control signaling.

In some examples, the CLI reporting configuration manager 1040 may be configured as or otherwise support a means for transmitting, via the control signaling, an indication of one or more beams to be measured for CLI, the one or more beams associated with the set of antenna panels, the set of CLI resources, or both, where the CLI report is associated with the one or more beams.

In some examples, the CLI reporting configuration manager 1040 may be configured as or otherwise support a means for transmitting, via the control signaling, one or more CLI indexes associated with the set of CLI resources, where each CLI index is associated with a receive beam at the first UE and a transmit beam at the second UE, where the CLI report is based on the one or more CLI indexes.

In some examples, each CLI index is associated with at least one antenna panel of the set of antenna panels.

In some examples, the CLI reporting configuration manager 1040 may be configured as or otherwise support a means for transmitting, via the control signaling, one or more antenna group identifiers associated with the set of antenna panels, one or more SRS resource set identifiers associated with the set of antenna panels, or both, where the CLI report is based on the one or more antenna group identifiers, the one or more SRS resource set identifiers, or both.

In some examples, the CLI reporting configuration manager 1040 may be configured as or otherwise support a means for transmitting, via the control signaling, a set of mappings between the set of antenna panels and the set of CLI resources, the set of mappings including a mapping between the antenna panel and a CLI resource from the set of CLI resources corresponding to the antenna panel. In some examples, the CLI report receiving manager 1030 may be configured as or otherwise support a means for receiving, via the CLI report and based on the mapping, an indication of the CLI resource corresponding to the antenna panel.

In some examples, the CLI report receiving manager 1030 may be configured as or otherwise support a means for receiving, via the CLI report, a set of multiple CLI measurements and a set of multiple antenna panel identifiers corresponding to the respective set of multiple CLI measurements, where the set of multiple antenna panel identifiers are associated with the set of antenna panels.

In some examples, the CLI report receiving manager 1030 may be configured as or otherwise support a means for receiving, via the CLI report, a set of multiple CLI measurements and an antenna panel identifier associated with the antenna panel, where the antenna panel identifier corresponds to the set of multiple CLI measurements.

In some examples, the QCL manager 1045 may be configured as or otherwise support a means for transmitting, via the control signaling, an indication of a QCL indicator and a set of antenna panel identifiers associated with the QCL indicator, the set of antenna panel identifiers corresponding to the set of antenna panels, and the QCL indicator associated with the set of CLI resources, where the CLI report is based on the QCL indicator and the set of antenna panel identifiers.

In some examples, the SRS resource set manager 1050 may be configured as or otherwise support a means for transmitting, via the control signaling, an indication of one or more SRS resource sets associated with the set of antenna panels, the one or more SRS resource sets associated with the set of CLI resources, where the CLI report is based on the one or more SRS resource sets.

In some examples, the CLI report is received via L1 signaling.

Figure 11:
FIG. 11 shows a diagram of a system including a device that supports techniques for panel-specific CLI measurement in accordance with one or more aspects of the present disclosure.

FIG. 11 shows a diagram of a system 1100 including a device 1105 that supports techniques for panel-specific CLI measurement in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for panel-specific CLI measurement). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting, to a first UE, control signaling indicating a set of antenna panels of the first UE usable for measuring CLI experienced within a set of CLI resources. The communications manager 1120 may be configured as or otherwise support a means for receiving, from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof. The communications manager 1120 may be configured as or otherwise support a means for communicating with the first UE, the second UE, or both, based on the CLI report.

By including or configuring the communications manager 1120 in accordance with examples as described herein, the device 1105 may support techniques for antenna panel-specific CLI reporting which enables UEs 115 to report CLI experienced at the respective UEs 115 on a panel-by-panel basis. Accordingly, techniques described herein may improve a granularity at which CLI may be reported to the network, thereby providing the network with a more complete and comprehensive picture regarding CLI experienced at the respective UEs 115. Moreover, by enabling UEs 115 to report CLI experienced at specific antenna panels, techniques described herein may enable the network to schedule wireless communications at UEs 115 via antenna panels that exhibit sufficient performance (e.g., low CLI), which may thereby improve an efficiency and reliability of wireless communications performed within the wireless communications system. Further, by decreasing CLI experienced within the wireless communications system, techniques described herein may reduce the quantity of retransmissions, thereby reducing power consumption at the UEs 115 and leading to a more efficient utilization of communication resources.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of techniques for panel-specific CLI measurement as described herein, or the processor 1135 and the memory 1125 may be otherwise configured to perform or support such operations.

FIG. 12 shows a flowchart illustrating a method 1200 that supports techniques for panel-specific CLI measurement in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling identifying a set of antenna panels of the first UE usable for measuring CLI experienced within a set of CLI resources. The operations of 1205 may be performed in accordance with examples as disclosed herein. In some examples, aspects of the operations of 1205 may be performed by a control signaling receiving manager 625 as described with reference to FIG. 6.

At 1210, the method may include performing CLI measurements on signals received from a second UE via the set of CLI resources and the set of antenna panels. The operations of 1210 may be performed in accordance with examples as disclosed herein. In some examples, aspects of the operations of 1210 may be performed by a CLI measurement manager 630 as described with reference to FIG. 6.

At 1215, the method may include transmitting a CLI report associated with CLI measurements performed on the signals received via an antenna panel of the set of antenna panels, where the CLI report includes an indication of the antenna panel, an indication one or more CLI resources from the set of CLI resources associated with the antenna panel, or a combination thereof. The operations of 1215 may be performed in accordance with examples as disclosed herein. In some examples, aspects of the operations of 1215 may be performed by a CLI report transmitting manager 635 as described with reference to FIG. 6.

FIG. 13 shows a flowchart illustrating a method 1300 that supports techniques for panel-specific CLI measurement in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include outputting (e.g., transmitting), to a first UE, control signaling indicating a set of antenna panels of the first UE usable for measuring CLI experienced within a set of CLI resources. The operations of 1305 may be performed in accordance with examples as disclosed herein. In some examples, aspects of the operations of 1305 may be performed by a control signaling transmitting manager 1025 as described with reference to FIG. 10.

At 1310, the method may include obtaining (e.g., receiving), from the first UE based on the control signaling, a CLI report associated with CLI measurements performed on signals received by the first UE from a second UE via an antenna panel of the set of antenna panels, where the CLI report includes an indication of the antenna panel, an indication one or more CLI resources from the set of CLI resources associated with the antenna panel, or a combination thereof. The operations of 1310 may be performed in accordance with examples as disclosed herein. In some examples, aspects of the operations of 1310 may be performed by a CLI report receiving manager 1030 as described with reference to FIG. 10.

At 1315, the method may include communicating with the first UE, the second UE, or both, based on the CLI report. The operations of 1315 may be performed in accordance with examples as disclosed herein. In some examples, aspects of the operations of 1315 may be performed by a UE communicating manager 1035 as described with reference to FIG. 10.

FIG. 14 shows a flowchart illustrating a method 1400 that supports techniques for panel-specific CLI measurement in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a set of antenna panels of the second UE usable for transmitting signals within a set of CLI resources. The operations of 1405 may be performed in accordance with examples as disclosed herein. In some examples, aspects of the operations of 1405 may be performed by a control signaling receiving manager 625 as described with reference to FIG. 6.

At 1410, the method may include transmitting signals via the set of CLI resources and the set of antenna panels based on the control signaling. The operations of 1410 may be performed in accordance with examples as disclosed herein. In some examples, aspects of the operations of 1410 may be performed by a reference signal transmitting manager 640 as described with reference to FIG. 6.

At 1415, the method may include receiving, based on transmitting the signals, additional control signaling including scheduling information associated with communications at the second UE, a transmission power associated with communications transmitted by the second UE, or a combination thereof. The operations of 1415 may be performed in accordance with examples as disclosed herein. In some examples, aspects of the operations of 1415 may be performed by a control signaling receiving manager 625 as described with reference to FIG. 6.

The following provides an overview of aspects of the present disclosure:

Aspect 1: A method for wireless communication at a first UE, comprising: receiving control signaling identifying a set of antenna panels of the first UE usable for measuring CLI experienced within a set of CLI resources; performing CLI measurements on signals received from a second UE via the set of CLI resources and the set of antenna panels; and transmitting a CLI report associated with CLI measurements performed on the signals received via an antenna panel of the set of antenna panels, wherein the CLI report comprises an indication of the antenna panel, an indication one or more CLI resources from the set of CLI resources associated with the antenna panel, or a combination thereof.

Aspect 2: The method of aspect 1, further comprising: receiving, via the control signaling, an indication of one or more beams to be measured for CLI, the one or more beams associated with the set of antenna panels, the set of CLI resources, or both, wherein CLI measurements are associated with the one or more beams.

Aspect 3: The method of any of aspects 1 through 2, further comprising: receiving, via the control signaling, one or more CLI indexes associated with the set of CLI resources, wherein each CLI index is associated with a receive beam at the first UE and a transmit beam at the second UE, wherein performing the CLI measurements is based at least in part on the one or more CLI indexes.

Aspect 4: The method of aspect 3, wherein each CLI index is associated with at least one antenna panel of the set of antenna panels.

Aspect 5: The method of any of aspects 1 through 4, further comprising: receiving, via the control signaling, one or more antenna group identifiers associated with the set of antenna panels, one or more SRS resource set identifiers associated with the set of antenna panels, or both, wherein performing the CLI measurements is based at least in part on the one or more antenna group identifiers, the one or more SRS resource set identifiers, or both.

Aspect 6: The method of any of aspects 1 through 5, further comprising: receiving, via the control signaling, a set of mappings between the set of antenna panels and the set of CLI resources, the set of mappings including a mapping between the antenna panel and a CLI resource from the set of CLI resources corresponding to the antenna panel; and transmitting, via the CLI report and based at least in part on the mapping, an indication of the CLI resource corresponding to the antenna panel.

Aspect 7: The method of any of aspects 1 through 6, further comprising: transmitting, via the CLI report, a plurality of CLI measurements and a plurality of antenna panel identifiers corresponding to the respective plurality of CLI measurements, wherein the plurality of antenna panel identifiers are associated with the set of antenna panels.

Aspect 8: The method of any of aspects 1 through 7, further comprising: transmitting, via the CLI report, a plurality of CLI measurements and an antenna panel identifier associated with the antenna panel, wherein the antenna panel identifier corresponds to the plurality of CLI measurements.

Aspect 9: The method of any of aspects 1 through 8, further comprising: receiving, via the control signaling, an indication of a QCL indicator and a set of antenna panel identifiers associated with the QCL indicator, the set of antenna panel identifiers corresponding to the set of antenna panels, and the QCL indicator associated with the set of CLI resources, wherein performing the CLI measurements is based at least in part on the QCL indicator and the set of antenna panel identifiers.

Aspect 10: The method of any of aspects 1 through 9, further comprising: receiving, via the control signaling, an indication of one or more SRS resource sets associated with the set of antenna panels, the one or more SRS resource sets associated with the set of CLI resources, wherein performing the CLI measurements is based at least in part on the one or more SRS resource sets.

Aspect 11: The method of any of aspects 1 through 10, wherein the CLI report is transmitted via L1 signaling.

Aspect 12: The method of any of aspects 1 through 11, wherein the signals received from the second UE comprise SRSs.

Aspect 13: A method for wireless communication at a network entity, comprising: transmitting, to a first UE, control signaling indicating a set of antenna panels of the first UE usable for measuring CLI experienced within a set of CLI resources; receiving, from the first UE based at least in part on the control signaling, a CLI report associated with CLI measurements performed on signals received by the first UE from a second UE via an antenna panel of the set of antenna panels, wherein the CLI report comprises an indication of the antenna panel, an indication one or more CLI resources from the set of CLI resources associated with the antenna panel, or a combination thereof; and communicating with the first UE, the second UE, or both, based at least in part on the CLI report.

Aspect 14: The method of aspect 13, further comprising: transmitting, to the second UE, additional control signaling indicating a second set of antenna panels of the second UE usable for transmitting the signals to the first UE within the set of CLI resources, wherein receiving the CLI report is based at least in part on transmitting the additional control signaling.

Aspect 15: The method of any of aspects 13 through 14, further comprising: transmitting, via the control signaling, an indication of one or more beams to be measured for CLI, the one or more beams associated with the set of antenna panels, the set of CLI resources, or both, wherein the CLI report is associated with the one or more beams.

Aspect 16: The method of any of aspects 13 through 15, further comprising: transmitting, via the control signaling, one or more CLI indexes associated with the set of CLI resources, wherein each CLI index is associated with a receive beam at the first UE and a transmit beam at the second UE, wherein the CLI report is based at least in part on the one or more CLI indexes.

Aspect 17: The method of aspect 16, wherein each CLI index is associated with at least one antenna panel of the set of antenna panels.

Aspect 18: The method of any of aspects 13 through 17, further comprising: transmitting, via the control signaling, one or more antenna group identifiers associated with the set of antenna panels, one or more SRS resource set identifiers associated with the set of antenna panels, or both, wherein the CLI report is based at least in part on the one or more antenna group identifiers, the one or more SRS resource set identifiers, or both.

Aspect 19: The method of any of aspects 13 through 18, further comprising: transmitting, via the control signaling, a set of mappings between the set of antenna panels and the set of CLI resources, the set of mappings including a mapping between the antenna panel and a CLI resource from the set of CLI resources corresponding to the antenna panel; and receiving, via the CLI report and based at least in part on the mapping, an indication of the CLI resource corresponding to the antenna panel.

Aspect 20: The method of any of aspects 13 through 19, further comprising: receiving, via the CLI report, a plurality of CLI measurements and a plurality of antenna panel identifiers corresponding to the respective plurality of CLI measurements, wherein the plurality of antenna panel identifiers are associated with the set of antenna panels.

Aspect 21: The method of any of aspects 13 through 20, further comprising: receiving, via the CLI report, a plurality of CLI measurements and an antenna panel identifier associated with the antenna panel, wherein the antenna panel identifier corresponds to the plurality of CLI measurements.

Aspect 22: The method of any of aspects 13 through 21, further comprising: transmitting, via the control signaling, an indication of a QCL indicator and a set of antenna panel identifiers associated with the QCL indicator, the set of antenna panel identifiers corresponding to the set of antenna panels, and the QCL indicator associated with the set of CLI resources, wherein the CLI report is based at least in part on the QCL indicator and the set of antenna panel identifiers.

Aspect 23: The method of any of aspects 13 through 22, further comprising: transmitting, via the control signaling, an indication of one or more SRS resource sets associated with the set of antenna panels, the one or more SRS resource sets associated with the set of CLI resources, wherein the CLI report is based at least in part on the one or more SRS resource sets.

Aspect 24: The method of any of aspects 13 through 23, wherein the CLI report is received via L1 signaling.

Aspect 25: A method for wireless communication at a second UE, comprising: receiving control signaling indicating a set of antenna panels of the second UE usable for transmitting signals within a set of CLI resources; transmitting signals via the set of CLI resources and the set of antenna panels based at least in part on the control signaling; and receiving, based at least in part on transmitting the signals, additional control signaling comprising scheduling information associated with communications at the second UE, a transmission power associated with communications transmitted by the second UE, or a combination thereof.

Aspect 26: The method of aspect 25, further comprising: receiving, via the control signaling, an indication of one or more beams usable for transmitting the signals, the one or more beams associated with the set of antenna panels, the set of CLI resources, or both, wherein transmitting the signals is based at least in part on the one or more beams.

Aspect 27: The method of any of aspects 25 through 26, further comprising: receiving, via the control signaling, one or more CLI indexes associated with the set of CLI resources, wherein each CLI index is associated with a transmit beam at the second UE and a receive beam at a first UE, wherein the signals are transmitted to the first UE based at least in part on the one or more CLI indexes.

Aspect 28: The method of aspect 27, wherein each CLI index is associated with at least one antenna panel of the set of antenna panels.

Aspect 29: The method of any of aspects 25 through 28, further comprising: receiving, via the control signaling, one or more antenna group identifiers associated with the set of antenna panels, one or more SRS resource set identifiers associated with the set of antenna panels, or both, wherein transmitting the signals is based at least in part on the one or more antenna group identifiers, the one or more SRS resource set identifiers, or both.

Aspect 30: The method of any of aspects 25 through 29, further comprising: receiving, via the control signaling, an indication of one or more transmit beams and a set of antenna panel identifiers associated with the one or more transmit beams, the set of antenna panel identifiers corresponding to the set of antenna panels, and the one or more transmit beams associated with the set of CLI resources, wherein transmitting the signals is based at least in part on the one or more transmit beams and the set of antenna panel identifiers.

Aspect 31: The method of any of aspects 25 through 30, further comprising: receiving, via the control signaling, an indication of one or more SRS resource sets associated with the set of antenna panels, the one or more SRS resource sets associated with the set of CLI resources, wherein transmitting the signals is based at least in part on the one or more SRS resource sets.

Aspect 32: The method of any of aspects 25 through 31, wherein the signals transmitted via the set of CLI resources comprise SRSs.

Aspect 33: An apparatus for wireless communication at a first UE, comprising a processor; memory coupled with the processor; and instructions stored in the memory and executable by the processor to cause the apparatus to perform a method of any of aspects 1 through 12.

Aspect 34: An apparatus for wireless communication at a first UE, comprising at least one means for performing a method of any of aspects 1 through 12.

Aspect 35: A non-transitory computer-readable medium storing code for wireless communication at a first UE, the code comprising instructions executable by a processor to perform a method of any of aspects 1 through 12.

Aspect 36: An apparatus for wireless communication at a network entity, comprising a processor; memory coupled with the processor; and instructions stored in the memory and executable by the processor to cause the apparatus to perform a method of any of aspects 13 through 24.

Aspect 37: An apparatus for wireless communication at a network entity, comprising at least one means for performing a method of any of aspects 13 through 24.

Aspect 38: A non-transitory computer-readable medium storing code for wireless communication at a network entity, the code comprising instructions executable by a processor to perform a method of any of aspects 13 through 24.

Aspect 39: An apparatus for wireless communication at a second UE, comprising a processor; memory coupled with the processor; and instructions stored in the memory and executable by the processor to cause the apparatus to perform a method of any of aspects 25 through 32.

Aspect 40: An apparatus for wireless communication at a second UE, comprising at least one means for performing a method of any of aspects 25 through 32.

Aspect 41: A non-transitory computer-readable medium storing code for wireless communication at a second UE, the code comprising instructions executable by a processor to perform a method of any of aspects 25 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple micro-processors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:

one or more processors;

one or more memories coupled with the one or more processors; and instructions stored in the one or more memories and executable by the one or more processors to cause the apparatus to:

receive control signaling that indicates a set of antenna panel identifiers corresponding to a set of antenna panels of the first UE usable for measuring cross-link interference experienced within a set of cross-link interference resources, wherein the control signaling further comprises a set of mappings between the set of antenna panels and the set of cross-link interference resources, the set of mappings including a mapping between an antenna panel of the set of antenna panels and a cross-link interference resource from the set of cross-link interference resources corresponding to the antenna panel;

perform cross-link interference measurements on signals received from a second UE via the set of cross-link interference resources and the set of antenna panels corresponding to the set of antenna panel identifiers; and transmit a cross-link interference report associated with the cross-link interference measurements performed on the signals received via the antenna panel of the set of antenna panels, wherein the cross-link interference report comprises, based at least in part on the mapping, an indication of one or more cross-link interference resources from the set of cross-link interference resources associated with the antenna panel or a combination of the indication of the one or more cross-link interference resources and an indication of the antenna panel.

2. The apparatus of claim 1, wherein the instructions are further executable by the one or more processors to cause the apparatus to:

receive, via the control signaling, an indication of one or more beams to be measured for the cross-link interference, the one or more beams associated with the set of antenna panels, the set of cross-link interference resources, or both, wherein the cross-link interference measurements are associated with the one or more beams.

3. The apparatus of claim 1, wherein the instructions are further executable by the one or more processors to cause the apparatus to:

receive, via the control signaling, one or more cross-link interference indexes associated with the set of cross-link interference resources, wherein each of the one or more cross-link interference indexes is associated with a receive beam at the first UE and a transmit beam at the second UE, wherein performing the cross-link interference measurements is based at least in part on the one or more cross-link interference indexes.

4. The apparatus of claim 3, wherein each of the one or more cross-link interference indexes is associated with at least one antenna panel of the set of antenna panels.

5. The apparatus of claim 1, wherein the instructions are further executable by the one or more processors to cause the apparatus to:

receive, via the control signaling, one or more antenna group identifiers associated with the set of antenna panels, one or more sounding reference signal resource set identifiers associated with the set of antenna panels, or both, wherein performing the cross-link interference measurements is based at least in part on the one or more antenna group identifiers, the one or more sounding reference signal resource set identifiers, or both.

6. The apparatus of claim 1, wherein the instructions are further executable by the one or more processors to cause the apparatus to:

transmit, via the cross-link interference report, a plurality of the cross-link interference measurements and the set of antenna panel identifiers corresponding to the respective plurality of cross-link interference measurements, wherein the set of antenna panel identifiers are associated with the set of antenna panels.

7. The apparatus of claim 1, wherein the instructions are further executable by the one or more processors to cause the apparatus to:

transmit, via the cross-link interference report, a plurality of the cross-link interference measurements and an antenna panel identifier associated with the antenna panel, wherein the antenna panel identifier corresponds to the plurality of cross-link interference measurements.

8. The apparatus of claim 1, wherein the instructions are further executable by the one or more processors to cause the apparatus to:

receive, via the control signaling, an indication of a quasi co-location indicator, wherein the set of antenna panel identifiers is associated with the quasi co-location indicator, and the quasi co-location indicator is associated with the set of cross-link interference resources, wherein performing the cross-link interference measurements is based at least in part on the quasi co-location indicator and the set of antenna panel identifiers.

9. The apparatus of claim 1, wherein the instructions are further executable by the one or more processors to cause the apparatus to:

receive, via the control signaling, an indication of one or more sounding reference signal resource sets associated with the set of antenna panels, the one or more sounding reference signal resource sets associated with the set of cross-link interference resources, wherein performing the cross-link interference measurements is based at least in part on the one or more sounding reference signal resource sets.

10. The apparatus of claim 1, wherein the cross-link interference report is transmitted via Layer one signaling.

11. The apparatus of claim 1, wherein the signals received from the second UE comprise sounding reference signals.

12. An apparatus for wireless communication at a network entity, comprising:

one or more processors;

one or more memories coupled with the one or more processors; and instructions stored in the one or more memories and executable by the one or more processors to cause the apparatus to:

output, to a first user equipment (UE), control signaling indicating a set of antenna panel identifiers corresponding to a set of antenna panels of the first UE usable for measuring cross-link interference experienced within a set of cross-link interference resources, wherein the control signaling further comprises a set of mappings between the set of antenna panels and the set of cross-link interference resources, the set of mappings including a mapping between an antenna panel of the set of antenna panels and a cross-link interference resource from the set of cross-link interference resources corresponding to the antenna panel;

obtain, from the first UE based at least in part on the control signaling, a cross-link interference report associated with cross-link interference measurements performed on signals received by the first UE from a second UE via the antenna panel of the set of antenna panels corresponding to the set of antenna panel identifiers, wherein the cross-link interference report comprises, based at least in part on the mapping, an indication of one or more cross-link interference resources from the set of cross-link interference resources associated with the antenna panel or a combination of the indication of the one or more cross-link interference resources and an indication of the antenna panel; and communicate with the first UE, the second UE, or both, based at least in part on the cross-link interference report.

13. The apparatus of claim 12, wherein the instructions are further executable by the one or more processors to cause the apparatus to:

output, to the second UE, additional control signaling indicating a second set of antenna panels of the second UE usable for transmitting the signals to the first UE within the set of cross-link interference resources, wherein obtaining the cross-link interference report is based at least in part on outputting the additional control signaling.

14. The apparatus of claim 12, wherein the instructions are further executable by the one or more processors to cause the apparatus to:

output, via the control signaling, an indication of one or more beams to be measured for the cross-link interference, the one or more beams associated with the set of antenna panels, the set of cross-link interference resources, or both, wherein the cross-link interference report is associated with the one or more beams.

15. The apparatus of claim 12, wherein the instructions are further executable by the one or more processors to cause the apparatus to:

output, via the control signaling, one or more cross-link interference indexes associated with the set of cross-link interference resources, wherein each of the one or more cross-link interference indexes is associated with a receive beam at the first UE and a transmit beam at the second UE, wherein the cross-link interference report is based at least in part on the one or more cross-link interference indexes.

16. The apparatus of claim 15, wherein each of the one or more cross-link interference indexes is associated with at least one antenna panel of the set of antenna panels.

17. The apparatus of claim 12, wherein the instructions are further executable by the one or more processors to cause the apparatus to:

output, via the control signaling, one or more antenna group identifiers associated with the set of antenna panels, one or more sounding reference signal resource set identifiers associated with the set of antenna panels, or both, wherein the cross-link interference report is based at least in part on the one or more antenna group identifiers, the one or more sounding reference signal resource set identifiers, or both.

18. The apparatus of claim 12, wherein the instructions are further executable by the one or more processors to cause the apparatus to:

obtain, via the cross-link interference report, a plurality of the cross-link interference measurements and the set of antenna panel identifiers corresponding to the respective plurality of cross-link interference measurements, wherein the set of antenna panel identifiers are associated with the set of antenna panels.

19. The apparatus of claim 12, wherein the instructions are further executable by the one or more processors to cause the apparatus to:

obtain, via the cross-link interference report, a plurality of the cross-link interference measurements and an antenna panel identifier associated with the antenna panel, wherein the antenna panel identifier corresponds to the plurality of cross-link interference measurements.

20. The apparatus of claim 12, wherein the instructions are further executable by the one or more processors to cause the apparatus to:

output, via the control signaling, an indication of a quasi co-location indicator, wherein the set of antenna panel identifiers is associated with the quasi co-location indicator, and the quasi co-location indicator is associated with the set of cross-link interference resources, wherein the cross-link interference report is based at least in part on the quasi co-location indicator and the set of antenna panel identifiers.

21. The apparatus of claim 12, wherein the instructions are further executable by the one or more processors to cause the apparatus to:

output, via the control signaling, an indication of one or more sounding reference signal resource sets associated with the set of antenna panels, the one or more sounding reference signal resource sets associated with the set of cross-link interference resources, wherein the cross-link interference report is based at least in part on the one or more sounding reference signal resource sets.

22. The apparatus of claim 12, wherein the cross-link interference report is received via Layer one signaling.

23. A method for wireless communication at a first user equipment (UE), comprising:

receiving control signaling that indicates a set of antenna panel identifiers corresponding to a set of antenna panels of the first UE usable for measuring cross-link interference experienced within a set of cross-link interference resources, wherein the control signaling further comprises a set of mappings between the set of antenna panels and the set of cross-link interference resources, the set of mappings including a mapping between an antenna panel of the set of antenna panels and a cross-link interference resource from the set of cross-link interference resources corresponding to the antenna panel;

performing cross-link interference measurements on signals received from a second UE via the set of cross-link interference resources and the set of antenna panels corresponding to the set of antenna panel identifiers; and transmitting a cross-link interference report associated with the cross-link interference measurements performed on the signals received via the antenna panel of the set of antenna panels, wherein the cross-link interference report comprises, based at least in part on the mapping, an indication of one or more cross-link interference resources from the set of cross-link interference resources associated with the antenna panel or a combination of the indication of the one or more cross-link interference resources and an indication of the antenna panel.

24. The method of claim 23, further comprising:

receiving, via the control signaling, an indication of one or more beams to be measured for the cross-link interference, the one or more beams associated with the set of antenna panels, the set of cross-link interference resources, or both, wherein the cross-link interference measurements are associated with the one or more beams.

25. The method of claim 23, further comprising:

receiving, via the control signaling, one or more cross-link interference indexes associated with the set of cross-link interference resources, wherein each of the one or more cross-link interference indexes is associated with a receive beam at the first UE and a transmit beam at the second UE, wherein performing the cross-link interference measurements is based at least in part on the one or more cross-link interference indexes.

26. The method of claim 23, further comprising:

receiving, via the control signaling, one or more antenna group identifiers associated with the set of antenna panels, one or more sounding reference signal resource set identifiers associated with the set of antenna panels, or both, wherein performing the cross-link interference measurements is based at least in part on the one or more antenna group identifiers, the one or more sounding reference signal resource set identifiers, or both.

27. A method for wireless communication at a network entity, comprising:

outputting, to a first user equipment (UE), control signaling indicating a set of antenna panel identifiers corresponding to a set of antenna panels of the first UE usable for measuring cross-link interference experienced within a set of cross-link interference resources, wherein the control signaling further comprises a set of mappings between the set of antenna panels and the set of cross-link interference resources, the set of mappings including a mapping between an antenna panel of the set of antenna panels and a cross-link interference resource from the set of cross-link interference resources corresponding to the antenna panel;

obtaining, from the first UE based at least in part on the control signaling, a cross-link interference report associated with cross-link interference measurements performed on signals received by the first UE from a second UE via the antenna panel of the set of antenna panels corresponding to the set of antenna panel identifiers, wherein the cross-link interference report comprises, based at least in part on the mapping, an indication of one or more cross-link interference resources from the set of cross-link interference resources associated with the antenna panel or a combination of the indication of the one or more cross-link interference resources and an indication of the antenna panel; and communicating with the first UE, the second UE, or both, based at least in part on the cross-link interference report.

\* \* \* \* \*